(12) United States Patent
Lu et al.

(10) Patent No.: US 11,613,209 B2
(45) Date of Patent: *Mar. 28, 2023

(54) SYSTEM AND METHOD FOR GUIDING REVERSING OF A VEHICLE TOWARD A TRAILER HITCH

(71) Applicant: MAGNA ELECTRONICS INC., Auburn Hills, MI (US)

(72) Inventors: Yuesheng Lu, Farmington Hills, MI (US); Joel S. Gibson, Linden, MI (US); Michael J. Higgins-Luthman, Livonia, MI (US); Steven V. Byrne, Goodrich, MI (US); Richard D. Shriner, Grand Blanc, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 353 days.

This patent is subject to a terminal disclaimer.

(21) Appl. No.: 16/948,177

(22) Filed: Sep. 8, 2020

(65) Prior Publication Data
US 2020/0398753 A1 Dec. 24, 2020

Related U.S. Application Data

(63) Continuation of application No. 15/790,172, filed on Oct. 23, 2017, now Pat. No. 10,766,417, which is a
(Continued)

(51) Int. Cl.
*B60R 1/00* (2022.01)
*B60Q 9/00* (2006.01)
(Continued)

(52) U.S. Cl.
CPC .............. *B60R 1/002* (2013.01); *B60C 9/005* (2013.01); *B60Q 9/005* (2013.01); *B60R 1/00* (2013.01);
(Continued)

(58) Field of Classification Search
CPC ..... B60R 1/002; B60R 1/00; B60R 2300/305; B60R 2300/307; B60R 2300/806;
(Continued)

(56) References Cited

U.S. PATENT DOCUMENTS 2,632,040 A   3/1953  Rabinow
2,827,594 A   3/1958  Rabinow
(Continued)

FOREIGN PATENT DOCUMENTS

DE   4107965 A1   9/1991
DE   4118208 A1   11/1991
(Continued)

OTHER PUBLICATIONS

The 2002 Infiniti Q45 Owners Manual (Year: 2002).*
(Continued)

*Primary Examiner* — Hai Phan
*Assistant Examiner* — Anthony D Afrifa-Kyei
(74) *Attorney, Agent, or Firm* — Honigman LLP

(57) ABSTRACT

A method for guiding reversing of a vehicle includes displaying, via a video display screen of the vehicle, and responsive to the vehicle being shifted into reverse gear, video images derived from image data captured by a rear backup camera of the vehicle. Responsive to actuation of an input by the driver of the vehicle, an alignment overlay is generated and electronically superimposed on the displayed video images to assist the driver in reversing the vehicle toward a trailer hitch of a trailer. The alignment overlay extends longitudinally rearward from a central region of the vehicle displayed in the displayed video images. The input is an actuatable input other than the vehicle being shifted into reverse gear. The alignment overlay is adjusted responsive to change in steering angle of the vehicle while the driver is executing the reversing maneuver of the vehicle.

29 Claims, 17 Drawing Sheets

Related U.S. Application Data continuation of application No. 13/902,042, filed on May 24, 2013, now Pat. No. 9,796,332, which is a continuation of application No. 12/677,539, filed as application No. PCT/US2008/076022 on Sep. 11, 2008, now Pat. No. 8,451,107.

(60) Provisional application No. 60/971,397, filed on Sep. 11, 2007.

(51) Int. Cl.
    *B62D 15/02* (2006.01)
    *G06T 11/00* (2006.01)
    *B60C 9/00* (2006.01)

(52) U.S. Cl.
    CPC .......... *B62D 15/0275* (2013.01); *G06T 11/00* (2013.01); *B60R 2300/305* (2013.01); *B60R 2300/307* (2013.01); *B60R 2300/806* (2013.01); *B60R 2300/8066* (2013.01); *B60R 2300/8086* (2013.01)

(58) Field of Classification Search
    CPC .... B60R 2300/8066; B60R 2300/8086; B60Q 9/005; B60Q 1/525; B60Q 9/008; B62D 15/0275; G06T 11/00; G08G 1/16; G01S 13/931; G01S 15/931
    See application file for complete search history.

(56) References Cited

U.S. PATENT DOCUMENTS

| | | |
|---|---|---|
| 3,349,394 A | 10/1967 | Carver |
| 3,601,614 A | 8/1971 | Platzer |
| 3,612,666 A | 10/1971 | Rabinow |
| 3,665,224 A | 5/1972 | Kelsey |
| 3,680,951 A | 8/1972 | Jordan et al. |
| 3,689,695 A | 9/1972 | Rosenfield et al. |
| 3,708,231 A | 1/1973 | Walters |
| 3,746,430 A | 7/1973 | Brean et al. |
| 3,807,832 A | 4/1974 | Castellion |
| 3,811,046 A | 5/1974 | Levick |
| 3,813,540 A | 5/1974 | Albrecht |
| 3,862,798 A | 1/1975 | Hopkins |
| 3,947,095 A | 3/1976 | Moultrie |
| 3,962,600 A | 6/1976 | Pittman |
| 3,985,424 A | 10/1976 | Steinacher |
| 3,986,022 A | 10/1976 | Hyatt |
| 4,037,134 A | 7/1977 | Loper |
| 4,052,712 A | 10/1977 | Ohama et al. |
| 4,093,364 A | 6/1978 | Miller |
| 4,111,720 A | 9/1978 | Michel et al. |
| 4,161,653 A | 7/1979 | Bedini et al. |
| 4,200,361 A | 4/1980 | Malvano et al. |
| 4,214,266 A | 7/1980 | Myers |
| 4,218,698 A | 8/1980 | Bart et al. |
| 4,236,099 A | 11/1980 | Rosenblum |
| 4,247,870 A | 1/1981 | Gabel et al. |
| 4,249,160 A | 2/1981 | Chilvers |
| 4,266,856 A | 5/1981 | Wainwright |
| 4,277,804 A | 7/1981 | Robison |
| 4,281,898 A | 8/1981 | Ochiai et al. |
| 4,288,814 A | 9/1981 | Talley et al. |
| 4,355,271 A | 10/1982 | Noack |
| 4,357,558 A | 11/1982 | Massoni et al. |
| 4,381,888 A | 5/1983 | Momiyama |
| 4,388,701 A | 6/1983 | Aichelmann, Jr. et al. |
| 4,420,238 A | 12/1983 | Felix |
| 4,431,896 A | 2/1984 | Lodetti |
| 4,443,057 A | 4/1984 | Bauer et al. |
| 4,460,831 A | 7/1984 | Oettinger et al. |
| 4,481,450 A | 11/1984 | Watanabe et al. |
| 4,491,390 A | 1/1985 | Tong-Shen |
| 4,512,637 A | 4/1985 | Ballmer |
| 4,529,275 A | 7/1985 | Ballmer |
| 4,529,873 A | 7/1985 | Ballmer et al. |
| 4,546,551 A | 10/1985 | Franks |
| 4,549,208 A | 10/1985 | Kamejima et al. |
| 4,571,082 A | 2/1986 | Downs |
| 4,572,619 A | 2/1986 | Reininger et al. |
| 4,580,875 A | 4/1986 | Bechtel et al. |
| 4,600,913 A | 7/1986 | Caine |
| 4,603,946 A | 8/1986 | Kato et al. |
| 4,614,415 A | 9/1986 | Hyatt |
| 4,620,141 A | 10/1986 | McCumber et al. |
| 4,623,222 A | 11/1986 | Itoh et al. |
| 4,626,850 A | 12/1986 | Chey |
| 4,629,941 A | 12/1986 | Ellis et al. |
| 4,630,109 A | 12/1986 | Barton |
| 4,632,509 A | 12/1986 | Ohmi et al. |
| 4,638,287 A | 1/1987 | Umebayashi et al. |
| 4,647,161 A | 3/1987 | Muller |
| 4,653,316 A | 3/1987 | Fukuhara |
| 4,669,825 A | 6/1987 | Itoh et al. |
| 4,669,826 A | 6/1987 | Itoh et al. |
| 4,671,615 A | 6/1987 | Fukada et al. |
| 4,672,457 A | 6/1987 | Hyatt |
| 4,676,601 A | 6/1987 | Itoh et al. |
| 4,690,508 A | 9/1987 | Jacob |
| 4,692,798 A | 9/1987 | Seko et al. |
| 4,697,883 A | 10/1987 | Suzuki et al. |
| 4,701,022 A | 10/1987 | Jacob |
| 4,713,685 A | 12/1987 | Nishimura et al. |
| 4,717,830 A | 1/1988 | Botts |
| 4,727,290 A | 2/1988 | Smith et al. |
| 4,731,669 A | 3/1988 | Hayashi et al. |
| 4,741,603 A | 5/1988 | Miyagi et al. |
| 4,768,135 A | 8/1988 | Kretschmer et al. |
| 4,772,942 A | 9/1988 | Tuck |
| 4,789,904 A | 12/1988 | Peterson |
| 4,793,690 A | 12/1988 | Gahan et al. |
| 4,817,948 A | 4/1989 | Simonelli |
| 4,820,933 A | 4/1989 | Hong et al. |
| 4,825,232 A | 4/1989 | Howdle |
| 4,838,650 A | 6/1989 | Stewart et al. |
| 4,847,772 A | 7/1989 | Michalopoulos et al. |
| 4,855,822 A | 8/1989 | Narendra et al. |
| 4,862,037 A | 8/1989 | Farber et al. |
| 4,867,561 A | 9/1989 | Fujii et al. |
| 4,871,917 A | 10/1989 | O'Farrell et al. |
| 4,872,051 A | 10/1989 | Dye |
| 4,881,019 A | 11/1989 | Shiraishi et al. |
| 4,882,565 A | 11/1989 | Gallmeyer |
| 4,886,960 A | 12/1989 | Molyneux et al. |
| 4,891,559 A | 1/1990 | Matsumoto et al. |
| 4,892,345 A | 1/1990 | Rachael, III |
| 4,895,790 A | 1/1990 | Swanson et al. |
| 4,896,030 A | 1/1990 | Miyaji |
| 4,907,870 A | 3/1990 | Brucker |
| 4,910,591 A | 3/1990 | Petrossian et al. |
| 4,916,374 A | 4/1990 | Schierbeek et al. |
| 4,917,477 A | 4/1990 | Bechtel et al. |
| 4,937,796 A | 6/1990 | Tendler |
| 4,953,305 A | 9/1990 | Van Lente et al. |
| 4,956,591 A | 9/1990 | Schierbeek et al. |
| 4,961,625 A | 10/1990 | Wood et al. |
| 4,967,319 A | 10/1990 | Seko |
| 4,970,653 A | 11/1990 | Kenue |
| 4,971,430 A | 11/1990 | Lynas |
| 4,974,078 A | 11/1990 | Tsai |
| 4,987,357 A | 1/1991 | Masaki |
| 4,991,054 A | 2/1991 | Walters |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,044,706 A | 9/1991 | Chen |
| 5,055,668 A | 10/1991 | French |
| 5,059,877 A | 10/1991 | Teder |
| 5,064,274 A | 11/1991 | Alten |
| 5,072,154 A | 12/1991 | Chen |

(56) References Cited

U.S. PATENT DOCUMENTS

| | | |
|---|---|---|
| 5,086,253 A | 2/1992 | Lawler |
| 5,096,287 A | 3/1992 | Kakinami et al. |
| 5,097,362 A | 3/1992 | Lynas |
| 5,121,200 A | 6/1992 | Choi |
| 5,124,549 A | 6/1992 | Michaels et al. |
| 5,130,709 A | 7/1992 | Toyama et al. |
| 5,140,465 A | 8/1992 | Yasui et al. |
| 5,148,014 A | 9/1992 | Lynam et al. |
| 5,168,378 A | 12/1992 | Black |
| 5,170,374 A | 12/1992 | Shimohigashi et al. |
| 5,172,235 A | 12/1992 | Wilm et al. |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,193,029 A | 3/1993 | Schofield et al. |
| 5,204,778 A | 4/1993 | Bechtel |
| 5,208,701 A | 5/1993 | Maeda |
| 5,245,422 A | 9/1993 | Borcherts et al. |
| 5,253,109 A | 10/1993 | O'Farrell et al. |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,487,116 A | 1/1996 | Nakano et al. |
| 5,498,866 A | 3/1996 | Bendicks et al. |
| 5,500,766 A | 3/1996 | Stonecypher |
| 5,510,983 A | 4/1996 | Iino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,312 A | 9/1996 | Shima et al. |
| 5,555,555 A | 9/1996 | Sato et al. |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,614,788 A | 3/1997 | Mullins |
| 5,619,370 A | 4/1997 | Guinosso |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,668,663 A | 9/1997 | Varaprasad et al. |
| 5,670,935 A | 9/1997 | Schofield et al. |
| 5,675,489 A | 10/1997 | Pomerleau |
| 5,677,851 A | 10/1997 | Kingdon et al. |
| 5,699,044 A | 12/1997 | Van Lente et al. |
| 5,703,568 A | 12/1997 | Hegyi |
| 5,724,187 A | 3/1998 | Varaprasad et al. |
| 5,724,316 A | 3/1998 | Brunts |
| 5,737,226 A | 4/1998 | Olson et al. |
| 5,757,949 A | 5/1998 | Kinoshita et al. |
| 5,760,826 A | 6/1998 | Nayar |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,765,116 A | 6/1998 | Wilson-Jones et al. |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,798,575 A | 8/1998 | O'Farrell et al. |
| 5,835,255 A | 11/1998 | Miles |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,914,815 A | 6/1999 | Bos |
| 5,923,027 A | 7/1999 | Stam et al. |
| 5,929,786 A | 7/1999 | Schofield et al. |
| 5,940,120 A | 8/1999 | Frankhouse et al. |
| 5,949,331 A | 9/1999 | Schofield et al. |
| 5,956,181 A | 9/1999 | Lin |
| 5,959,367 A | 9/1999 | O'Farrell et al. |
| 5,959,555 A | 9/1999 | Furuta |
| 5,963,247 A | 10/1999 | Banitt |
| 5,964,822 A | 10/1999 | Alland et al. |
| 5,971,552 A | 10/1999 | O'Farrell et al. |
| 5,986,796 A | 11/1999 | Miles |
| 5,990,469 A | 11/1999 | Bechtel et al. |
| 5,990,649 A | 11/1999 | Nagao et al. |
| 6,001,486 A | 12/1999 | Varaprasad et al. |
| 6,009,336 A | 12/1999 | Harris et al. |
| 6,020,704 A | 2/2000 | Buschur |
| 6,049,171 A | 4/2000 | Stam et al. |
| 6,066,933 A | 5/2000 | Ponziana |
| 6,084,519 A | 7/2000 | Coulling et al. |
| 6,087,953 A | 7/2000 | DeLine et al. |
| 6,097,023 A | 8/2000 | Schofield et al. |
| 6,097,024 A | 8/2000 | Stam et al. |

(56) References Cited

U.S. PATENT DOCUMENTS

| | | |
|---|---|---|
| 6,116,743 A | 9/2000 | Hoek |
| 6,118,383 A | 9/2000 | Hegyi |
| 6,124,647 A | 9/2000 | Marcus et al. |
| 6,124,886 A | 9/2000 | DeLine et al. |
| 6,139,172 A | 10/2000 | Bos et al. |
| 6,144,022 A | 11/2000 | Tenenbaum et al. |
| 6,172,613 B1 | 1/2001 | DeLine et al. |
| 6,175,164 B1 | 1/2001 | O'Farrell et al. |
| 6,175,300 B1 | 1/2001 | Kendrick |
| 6,198,409 B1 | 3/2001 | Schofield et al. |
| 6,201,642 B1 | 3/2001 | Bos |
| 6,222,447 B1 | 4/2001 | Schofield et al. |
| 6,222,460 B1 | 4/2001 | DeLine et al. |
| 6,243,003 B1 | 6/2001 | DeLine et al. |
| 6,250,148 B1 | 6/2001 | Lynam |
| 6,259,412 B1 | 7/2001 | Duroux |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,291,906 B1 | 9/2001 | Marcus et al. |
| 6,294,989 B1 | 9/2001 | Schofield et al. |
| 6,297,781 B1 | 10/2001 | Turnbull et al. |
| 6,302,545 B1 | 10/2001 | Schofield et al. |
| 6,310,611 B1 | 10/2001 | Caldwell |
| 6,313,454 B1 | 11/2001 | Bos et al. |
| 6,317,057 B1 | 11/2001 | Lee |
| 6,320,176 B1 | 11/2001 | Schofield et al. |
| 6,320,282 B1 | 11/2001 | Caldwell |
| 6,326,613 B1 | 12/2001 | Heslin et al. |
| 6,329,925 B1 | 12/2001 | Skiver et al. |
| 6,333,759 B1 | 12/2001 | Mazzilli |
| 6,341,523 B2 | 1/2002 | Lynam |
| 6,353,392 B1 | 3/2002 | Schofield et al. |
| 6,366,213 B2 | 4/2002 | DeLine et al. |
| 6,370,329 B1 | 4/2002 | Teuchert |
| 6,396,397 B1 | 5/2002 | Bos et al. |
| 6,411,204 B1 | 6/2002 | Bloomfield et al. |
| 6,411,328 B1 | 6/2002 | Franke et al. |
| 6,420,975 B1 | 7/2002 | DeLine et al. |
| 6,424,273 B1 | 7/2002 | Gutta et al. |
| 6,428,172 B1 | 8/2002 | Hutzel et al. |
| 6,430,303 B1 | 8/2002 | Naoi et al. |
| 6,433,676 B2 | 8/2002 | DeLine et al. |
| 6,433,817 B1 | 8/2002 | Guerra |
| 6,442,465 B2 | 8/2002 | Breed et al. |
| 6,477,464 B2 | 11/2002 | McCarthy et al. |
| 6,480,104 B1 | 11/2002 | Wall et al. |
| 6,485,155 B1 | 11/2002 | Duroux et al. |
| 6,497,503 B1 | 12/2002 | Dassanayake et al. |
| 6,498,620 B2 | 12/2002 | Schofield et al. |
| 6,513,252 B1 | 2/2003 | Schierbeek |
| 6,516,664 B2 | 2/2003 | Lynam |
| 6,523,964 B2 | 2/2003 | Schofield et al. |
| 6,534,884 B2 | 3/2003 | Marcus et al. |
| 6,539,306 B2 | 3/2003 | Turnbull |
| 6,547,133 B1 | 4/2003 | Devries, Jr. et al. |
| 6,553,130 B1 | 4/2003 | Lemelson et al. |
| 6,559,435 B2 | 5/2003 | Schofield et al. |
| 6,574,033 B1 | 6/2003 | Chui et al. |
| 6,578,017 B1 | 6/2003 | Ebersole et al. |
| 6,587,573 B1 | 7/2003 | Stam et al. |
| 6,589,625 B1 | 7/2003 | Kothari et al. |
| 6,593,565 B2 | 7/2003 | Heslin et al. |
| 6,594,583 B2 | 7/2003 | Ogura et al. |
| 6,611,202 B2 | 8/2003 | Schofield et al. |
| 6,611,610 B1 | 8/2003 | Stam et al. |
| 6,625,587 B1 | 9/2003 | Erten et al. |
| 6,627,918 B2 | 9/2003 | Getz et al. |
| 6,631,994 B2 | 10/2003 | Suzuki et al. |
| 6,636,258 B2 | 10/2003 | Strumolo |
| 6,648,477 B2 | 11/2003 | Hutzel et al. |
| 6,650,233 B2 | 11/2003 | DeLine et al. |
| 6,650,455 B2 | 11/2003 | Miles |
| 6,672,731 B2 | 1/2004 | Schnell et al. |
| 6,674,562 B1 | 1/2004 | Miles |
| 6,678,614 B2 | 1/2004 | McCarthy et al. |
| 6,680,792 B2 | 1/2004 | Miles |
| 6,690,268 B2 | 2/2004 | Schofield et al. |
| 6,700,605 B1 | 3/2004 | Toyoda et al. |
| 6,703,925 B2 | 3/2004 | Steffel |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,735,506 B2 | 5/2004 | Breed et al. |
| 6,741,377 B2 | 5/2004 | Miles |
| 6,744,353 B2 | 6/2004 | Sjonell |
| 6,757,109 B2 | 6/2004 | Bos |
| 6,762,867 B2 | 7/2004 | Lippert et al. |
| 6,765,607 B2 | 7/2004 | Mizusawa et al. |
| 6,794,119 B2 | 9/2004 | Miles |
| 6,795,221 B1 | 9/2004 | Urey |
| 6,802,617 B2 | 10/2004 | Schofield et al. |
| 6,806,452 B2 | 10/2004 | Bos et al. |
| 6,822,563 B2 | 11/2004 | Bos et al. |
| 6,823,241 B2 | 11/2004 | Shirato et al. |
| 6,824,281 B2 | 11/2004 | Schofield et al. |
| 6,831,261 B2 | 12/2004 | Schofield et al. |
| 6,847,487 B2 | 1/2005 | Burgner |
| 6,882,287 B2 | 4/2005 | Schofield |
| 6,889,161 B2 | 5/2005 | Winner et al. |
| 6,891,563 B2 | 5/2005 | Schofield et al. |
| 6,909,753 B2 | 6/2005 | Meehan et al. |
| 6,946,978 B2 | 9/2005 | Schofield |
| 6,953,253 B2 | 10/2005 | Schofield et al. |
| 6,968,736 B2 | 11/2005 | Lynam |
| 6,970,184 B2 | 11/2005 | Hirama et al. |
| 6,975,775 B2 | 12/2005 | Rykowski et al. |
| 7,004,593 B2 | 2/2006 | Weller et al. |
| 7,004,606 B2 | 2/2006 | Schofield |
| 7,005,974 B2 | 2/2006 | McMahon et al. |
| 7,006,127 B2 | 2/2006 | Mizusawa et al. |
| 7,038,577 B2 | 5/2006 | Pawlicki et al. |
| 7,062,300 B1 | 6/2006 | Kim |
| 7,065,432 B2 | 6/2006 | Moisel et al. |
| 7,085,637 B2 | 8/2006 | Breed et al. |
| 7,092,548 B2 | 8/2006 | Laumeyer et al. |
| 7,116,246 B2 | 10/2006 | Winter et al. |
| 7,123,168 B2 | 10/2006 | Schofield |
| 7,133,661 B2 | 11/2006 | Hatae et al. |
| 7,149,613 B2 | 12/2006 | Stam et al. |
| 7,167,779 B2 | 1/2007 | Kashiwada et al. |
| 7,167,796 B2 | 1/2007 | Taylor et al. |
| 7,202,776 B2 | 4/2007 | Breed |
| 7,227,459 B2 | 6/2007 | Bos et al. |
| 7,227,611 B2 | 6/2007 | Hull et al. |
| 7,311,406 B2 | 12/2007 | Schofield et al. |
| 7,325,934 B2 | 2/2008 | Schofield et al. |
| 7,325,935 B2 | 2/2008 | Schofield et al. |
| 7,339,149 B1 | 3/2008 | Schofield et al. |
| 7,344,261 B2 | 3/2008 | Schofield et al. |
| 7,375,803 B1 | 5/2008 | Bamji |
| 7,380,948 B2 | 6/2008 | Schofield et al. |
| 7,388,182 B2 | 6/2008 | Schofield et al. |
| 7,402,786 B2 | 7/2008 | Schofield et al. |
| 7,423,248 B2 | 9/2008 | Schofield et al. |
| 7,423,821 B2 | 9/2008 | Bechtel et al. |
| 7,425,076 B2 | 9/2008 | Schofield et al. |
| 7,459,664 B2 | 12/2008 | Schofield et al. |
| 7,526,103 B2 | 4/2009 | Schofield et al. |
| 7,561,181 B2 | 7/2009 | Schofield et al. |
| 7,565,006 B2 | 7/2009 | Stam et al. |
| 7,616,781 B2 | 11/2009 | Schofield et al. |
| 7,619,508 B2 | 11/2009 | Lynam et al. |
| 7,633,383 B2 | 12/2009 | Dunsmoir et al. |
| 7,639,149 B2 | 12/2009 | Katoh |
| 7,676,087 B2 | 3/2010 | Dhua et al. |
| 7,697,786 B2 | 4/2010 | Camus et al. |
| 7,720,580 B2 | 5/2010 | Higgins-Luthman |
| 7,843,451 B2 * | 11/2010 | Lafon .................. G06T 15/205 345/428 |
| 7,855,778 B2 | 12/2010 | Yung et al. |
| 7,881,496 B2 | 2/2011 | Camilleri et al. |

(56) References Cited

U.S. PATENT DOCUMENTS

| | | |
|---|---|---|
| 7,914,187 B2 | 3/2011 | Higgins-Luthman et al. |
| 7,930,160 B1 | 4/2011 | Hosagrahara et al. |
| 8,017,898 B2 | 9/2011 | Lu et al. |
| 8,224,031 B2 | 7/2012 | Saito |
| 8,237,794 B2 | 8/2012 | Moritz et al. |
| 8,451,107 B2 | 5/2013 | Lu et al. |
| 9,796,332 B2 | 10/2017 | Lu et al. |
| 10,766,417 B2 | 9/2020 | Lu et al. |
| 2002/0015153 A1 | 2/2002 | Downs |
| 2002/0044065 A1 | 4/2002 | Quist et al. |
| 2002/0113873 A1 | 8/2002 | Williams |
| 2002/0159270 A1 | 10/2002 | Lynam et al. |
| 2003/0137586 A1 | 7/2003 | Lewellen |
| 2003/0222982 A1 | 12/2003 | Hamdan et al. |
| 2003/0227777 A1 | 12/2003 | Schofield |
| 2004/0012488 A1 | 1/2004 | Schofield |
| 2004/0016870 A1 | 1/2004 | Pawlicki et al. |
| 2004/0032321 A1 | 2/2004 | McMahon et al. |
| 2004/0051634 A1 | 3/2004 | Schofield et al. |
| 2004/0114381 A1 | 6/2004 | Salmeen et al. |
| 2004/0128065 A1 | 7/2004 | Taylor et al. |
| 2004/0200948 A1 | 10/2004 | Bos et al. |
| 2005/0078389 A1 | 4/2005 | Kulas et al. |
| 2005/0134966 A1 | 6/2005 | Burgner |
| 2005/0134983 A1 | 6/2005 | Lynam |
| 2005/0146792 A1 | 7/2005 | Schofield et al. |
| 2005/0169003 A1 | 8/2005 | Lindahl et al. |
| 2005/0195488 A1 | 9/2005 | McCabe et al. |
| 2005/0200700 A1 | 9/2005 | Schofield et al. |
| 2005/0219852 A1 | 10/2005 | Stam et al. |
| 2005/0232469 A1 | 10/2005 | Schofield et al. |
| 2005/0237385 A1 | 10/2005 | Kosaka et al. |
| 2005/0264891 A1 | 12/2005 | Uken et al. |
| 2006/0018511 A1 | 1/2006 | Stam et al. |
| 2006/0018512 A1 | 1/2006 | Stam et al. |
| 2006/0028731 A1 | 2/2006 | Schofield et al. |
| 2006/0050018 A1 | 3/2006 | Hutzel et al. |
| 2006/0080005 A1 | 4/2006 | Lee et al. |
| 2006/0091813 A1 | 5/2006 | Stam et al. |
| 2006/0103727 A1 | 5/2006 | Tseng |
| 2006/0125919 A1 | 6/2006 | Camilleri et al. |
| 2006/0164230 A1 | 7/2006 | DeWind et al. |
| 2006/0250501 A1 | 11/2006 | Wildmann et al. |
| 2007/0023613 A1 | 2/2007 | Schofield et al. |
| 2007/0104476 A1 | 5/2007 | Yasutomi et al. |
| 2007/0109406 A1 | 5/2007 | Schofield et al. |
| 2007/0109651 A1 | 5/2007 | Schofield et al. |
| 2007/0109652 A1 | 5/2007 | Schofield et al. |
| 2007/0109653 A1 | 5/2007 | Schofield et al. |
| 2007/0109654 A1 | 5/2007 | Schofield et al. |
| 2007/0120657 A1* | 5/2007 | Schofield ............ B60S 1/0844 348/148 |
| 2007/0176080 A1 | 8/2007 | Schofield et al. |
| 2007/0242339 A1 | 10/2007 | Bradley |
| 2008/0077882 A1* | 3/2008 | Kramer ............ G01C 21/3688 715/810 |
| 2008/0147321 A1 | 6/2008 | Howard et al. |
| 2008/0180529 A1 | 7/2008 | Taylor et al. |
| 2008/0192132 A1 | 8/2008 | Bechtel et al. |
| 2008/0266541 A1* | 10/2008 | Yung ............ G01S 7/4813 348/223.1 |
| 2009/0113509 A1 | 4/2009 | Tseng et al. |
| 2009/0160987 A1 | 6/2009 | Bechtel et al. |
| 2009/0190015 A1 | 7/2009 | Bechtel et al. |
| 2009/0256938 A1 | 10/2009 | Bechtel et al. |
| 2010/0045797 A1 | 2/2010 | Schofield et al. |
| 2012/0045112 A1 | 2/2012 | Lundblad et al. |

FOREIGN PATENT DOCUMENTS

| | | |
|---|---|---|
| DE | 4139515 A1 | 6/1992 |
| DE | 4123641 A1 | 1/1993 |
| EP | 0416222 A2 | 3/1991 |
| EP | 0426503 A1 | 5/1991 |
| EP | 0513476 A1 | 11/1992 |
| EP | 1288072 A2 | 3/2003 |
| FR | 2641237 A1 | 7/1990 |
| FR | 2672857 A1 | 8/1992 |
| FR | 2673499 A1 | 9/1992 |
| FR | 2726144 A1 | 4/1996 |
| GB | 2244187 A | 11/1991 |
| GB | 2255539 A | 11/1992 |
| GB | 2327823 A | 2/1999 |
| JP | 59114139 | 7/1984 |
| JP | 6079889 | 10/1986 |
| JP | 6272245 | 5/1987 |
| JP | 6414700 | 1/1989 |
| JP | 01123587 | 5/1989 |
| JP | 01-141137 | 6/1989 |
| JP | 03-061192 | 3/1991 |
| JP | 3099952 | 4/1991 |
| JP | 03284413 | 12/1991 |
| JP | 04114587 | 4/1992 |
| JP | 04-245866 | 9/1992 |
| JP | 05-000638 | 1/1993 |
| JP | 05050883 | 3/1993 |
| JP | 05-213113 | 8/1993 |
| JP | 61-056638 | 6/1994 |
| JP | 6227318 B2 | 8/1994 |
| JP | 06267304 | 9/1994 |
| JP | 06276524 | 9/1994 |
| JP | 06295601 | 10/1994 |
| JP | 07004170 | 1/1995 |
| JP | 07-032936 | 2/1995 |
| JP | 07047878 | 2/1995 |
| JP | 07052706 | 2/1995 |
| JP | 07069125 | 3/1995 |
| JP | 07105496 | 4/1995 |
| JP | 08166221 | 6/1996 |
| JP | 05-077657 | 7/1997 |
| JP | 2630604 | 7/1997 |
| JP | 2003083742 A | 3/2003 |
| JP | 3945467 B2 | 7/2007 |
| WO | 1996021581 A1 | 7/1996 |
| WO | 1986005147 | 9/1996 |
| WO | 1997035743 | 10/1997 |
| WO | 1998014974 A1 | 4/1998 |

OTHER PUBLICATIONS

Article entitled On-Chip CMOS Sensors for VLSI Imaging Systems,: published by VLSI Vision Limited, 1991.

Bow, Sing T., "Pattern Recognition and Image Preprocessing (Signal Processing and Communications)", CRC Press, Jan. 15, 2002, pp. 557-559.

Dana H. Ballard and Christopher M. Brown, Computer Vision, Prentice-Hall, Englewood Cliffs, New Jersey, 5 pages, 1982.

Decision—Motions—Bd. R. 125(a), dated Aug. 29, 2006 in connection with Interference No. 105,325, which involved U.S. Appl. No. 09/441,341, filed Nov. 16, 1999 by Schofield et al. and U.S. Pat. No. 5,837,994, issued to Stam et al.

G. Wang, D. Renshaw, P.B. Denyer and M. Lu, CMOS Video Cameras, article, 1991, 4 pages, University of Edinburgh, UK.

Hamit, Francis "360-Degree Interactivity: New Video and Still Cameras Provide a Global Roaming Viewpoint," Advanced Imaging, Mar. 1997, p. 50.

J. Borenstein et al., "Where am I? Sensors and Method for Mobile Robot Positioning", University of Michigan, Apr. 1996, pp. 2, 125-128.

Johannas, Laura "A New Microchip Ushers in Cheaper Digital Cameras," The Wall Street Journal, Aug. 21, 1998, p. B1.

Pratt, "Digital Image Processing, Passage—ED.3", John Wiley & Sons, US, Jan. 1, 2001, pp. 657-659, XP002529771.

Reexamination Control No. 90/007,519, Reexamination of U.S. Pat. No. 6,222,447, issued to Schofield et al.

Reexamination Control No. 90/007,520, Reexamination of U.S. Pat. No. 5,949,331, issued to Schofield et al.

Reexamination Control No. 90/011,477, Reexamination of U.S. Pat. No. 5,949,331, issued to Schofield et al.

(56) References Cited

OTHER PUBLICATIONS

Reexamination Control No. 90/011,478, Reexamination of U.S. Pat. No. 6,222,447, issued to Schofield et al.
Tokimaru et al., "CMOS Rear-View TV System with CCD Camera", National Technical Report vol. 34, No. 3, pp. 329-336, Jun. 1988 (Japan).
Van Leeuwen et al., "Motion Estimation in Image Sequences for Traffic Applications", vol. 1, May 1, 2000, pp. 354-359, XP002529773.
Van Leeuwen et al., "Motion Estimation with a Mobile Camera for Traffic Applications", IEEE, US, vol. 1, Oct. 3, 2000, pp. 58-63.
Van Leeuwen et al., "Motion Interpretation for In-Car Vision Systems", IEEE, US, vol. 1, Sep. 30, 2002, p. 135-140.
Van Leeuwen et al., "Requirements for Motion Estimation in Image Sequences for Traffic Applications", IEEE, US, vol. 1, May 24, 1999, pp. 145-150, XP010340272.
Van Leuven et al., "Real-Time Vehicle Tracking in Image Sequences", IEEE, US, vol. 3, May 21, 2001, pp. 2049-2054, XP010547308.
Vlacic et al. (Eds), "Intelligent Vehicle Tecnologies, Theory and Applications", Society of Automotive Engineers Inc., edited by SAE International, 2001.
International Search Report and Written Opinion dated Nov. 24, 2008 for corresponding PCT Application No. PCT/US2008/076022.
Supplementary European Search Report dated Sep. 4, 2013 from corresponding European Application No. EP08830763.
The 2002 Infiniti Q45 Owners Manual.

\* cited by examiner

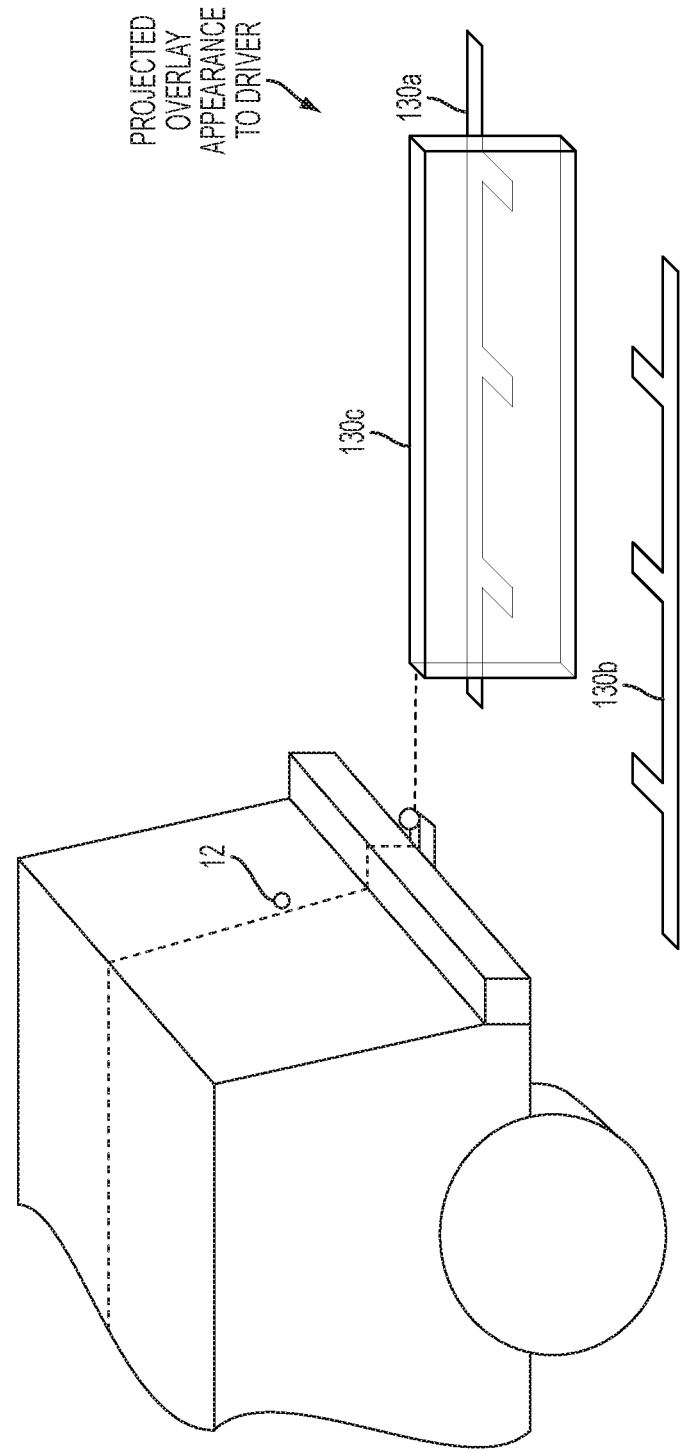

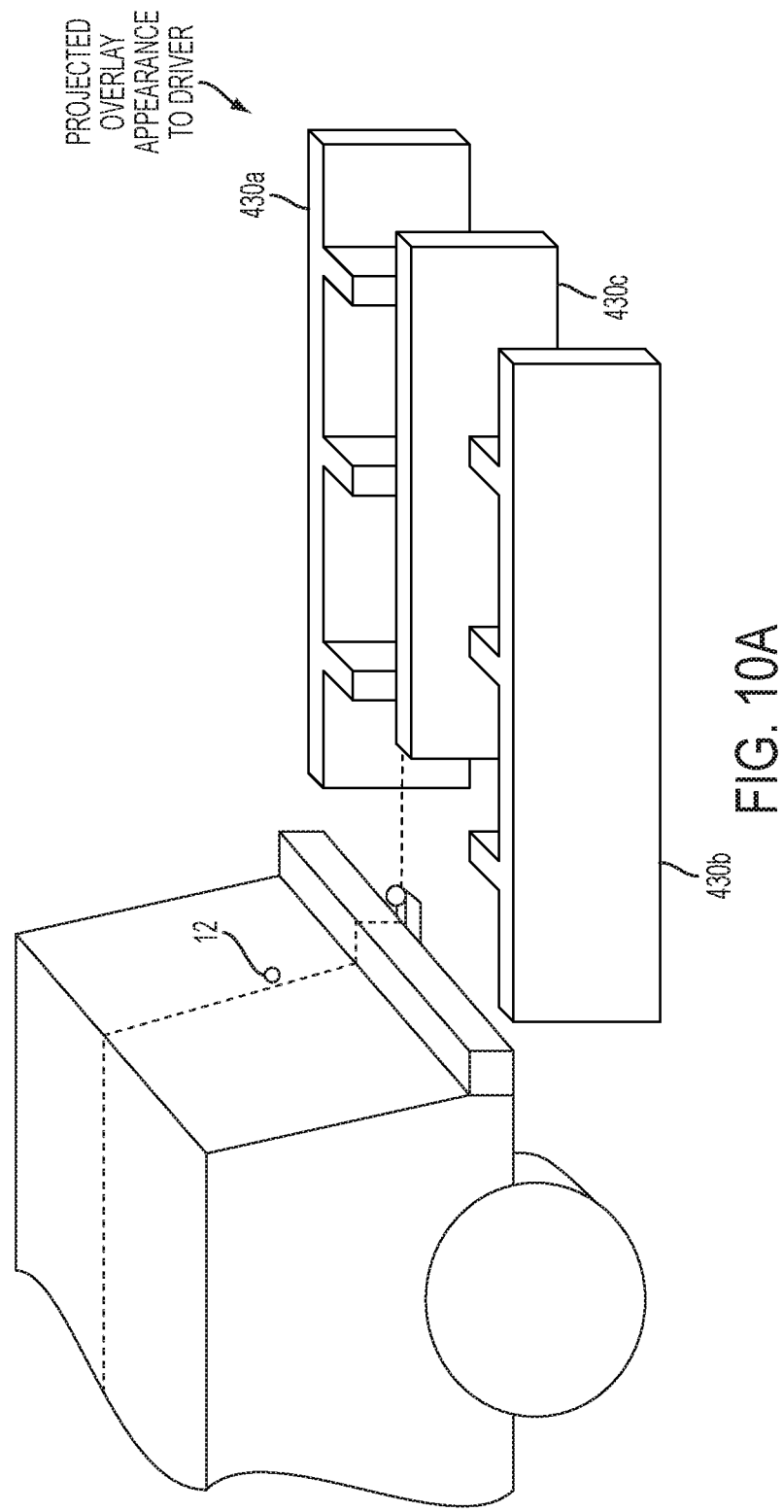

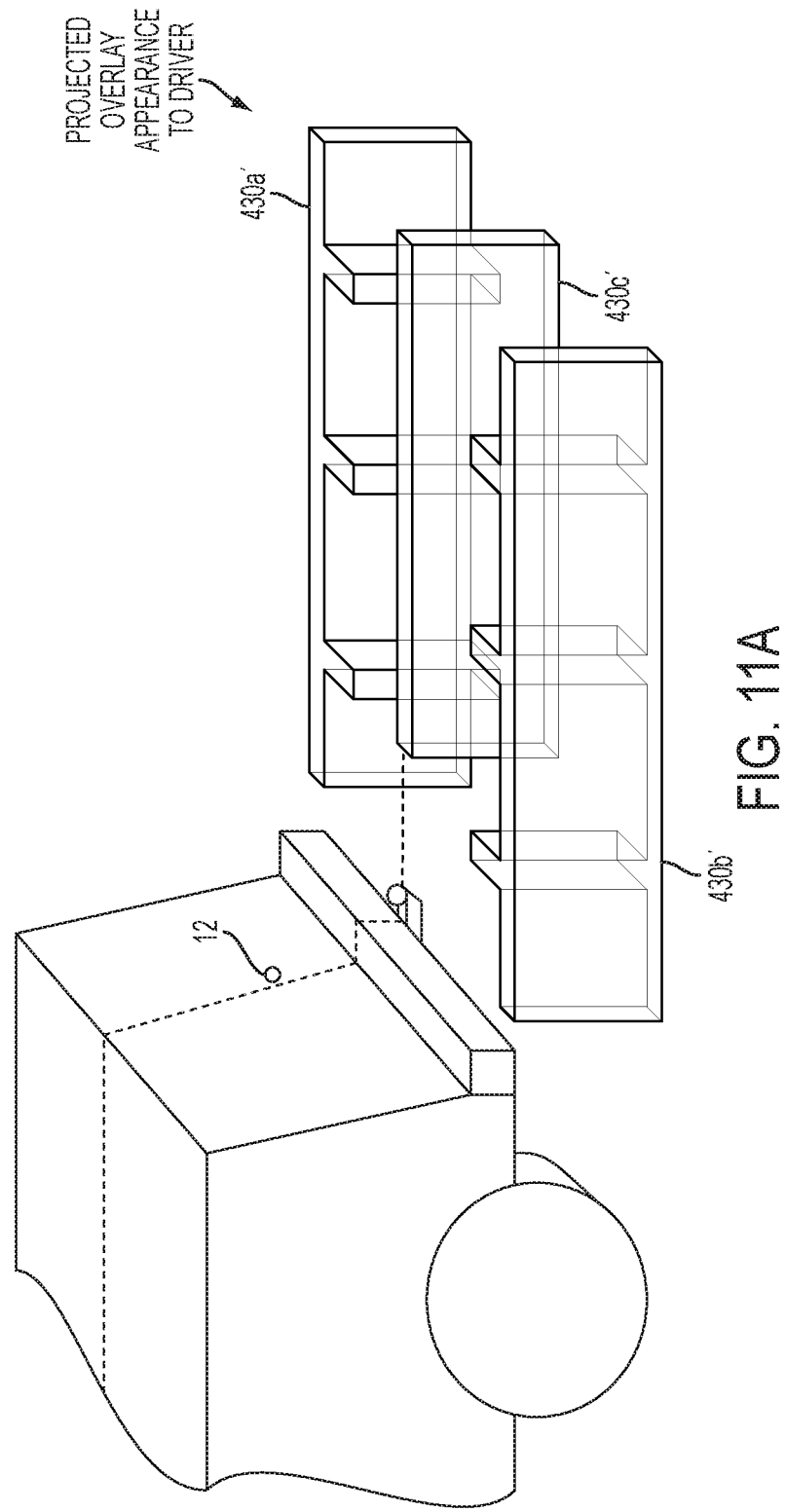

SYSTEM AND METHOD FOR GUIDING REVERSING OF A VEHICLE TOWARD A TRAILER HITCH

CROSS REFERENCE TO RELATED APPLICATIONS

The present application is a continuation of U.S. patent application Ser. No. 15/790,172, filed Oct. 23, 2017, now U.S. Pat. No. 10,766,417, which is a continuation of U.S. patent application Ser. No. 13/902,042, filed May 24, 2013, now U.S. Pat. No. 9,796,332, which is a continuation of U.S. patent application Ser. No. 12/677,539, filed Mar. 31, 2010, now U.S. Pat. No. 8,451,107, which is a 371 national phase filing of PCT Application No. PCT/US08/76022, filed Sep. 11, 2008, which claims the benefit of U.S. provisional application Ser. No. 60/971,397, filed Sep. 11, 2007, which is hereby incorporated herein by reference in its entirety.

FIELD OF THE INVENTION

The present invention relates generally to imaging or vision systems, particularly for vehicles which provide a vehicle operator with wide angle scenic information of an area immediately around the vehicle, such as rearward of the vehicle.

BACKGROUND OF THE INVENTION

A long felt need in the art of vehicle vision systems, such as rear-view systems, has been to provide an operator of a vehicle with wide angle scenic information of an area around the vehicle, such as directly rearward of the vehicle, when the vehicle is traveling in reverse. Neither interior rear-view mirrors nor side exterior mirrors allow for visibility of the area immediately rearward of the vehicle's bumper, which is the information most critical to the vehicle operator when backing up. Therefore, various camera-based rear view vision systems have been proposed to provide visibility of this blind spot.

It is also known to provide a graphic overlay on the displayed image of the rearward scene to enhance the driver's perception of the rearward field of view. Examples of such graphic overlays are described in U.S. Pat. Nos. 5,670,935; 5,949,331; 6,222,447 and 6,611,202, which are hereby incorporated herein by reference in their entireties.

Various camera-based rear vision systems for vehicles backing up have been proposed. In one form of these systems, a camera with a conventional, standard lens is located on the rearward portion of the vehicle to provide a view of the area behind the vehicle. However, standard lenses fail to capture a wide angle view of the area, thus failing to provide the vehicle operator with an image of the entire critical area directly rearward of the vehicle. In order to provide a wider angle view of the rearward area, a wide angle lens system may be used with the camera to capture the critical area. Examples of such systems are described in U.S. Pat. Nos. 6,922,292; 6,757,109; 6,717,610; 6,590,719 and 6,201,642, which are hereby incorporated herein by reference in their entireties.

SUMMARY OF THE INVENTION

The present invention is directed toward enhancing exterior visibility to the driver of a vehicle by providing an imaging system that provides a wide angle field of view of the area directly exteriorly of a vehicle, and that provides a graphic overlay superimposed on a displayed image to enhance the driver's viewing and understanding or cognitive awareness of the displayed image of the scene rearward of the vehicle and any object or objects detected therein. The present invention is directed towards enhancing the interpretation of visual information in a rearview vision system by presenting information in a manner which does not require significant concentration of the driver or present distractions to the driver.

The rearview vision system of the present invention has an image capture device or image sensor or camera positioned on the vehicle and directed rearwardly with respect to the direction of travel of the vehicle, and a display for displaying images captured by the image capture device. Image enhancement means may be provided for enhancing the displayed image, such as in the form of graphic overlays superimposed on the displayed image. Such graphic overlays may include indicia of the anticipated path of travel of the vehicle which is useful in assisting the driver in guiding the vehicle in reverse directions. The graphic overlays may be flashed or intermittently activated and/or displayed in different colors depending on a distance to a detected object rearward of the vehicle so as to provide a spectral cue and a spatial cue to the driver as the driver maneuvers the vehicle in a rearward direction. The graphic overlays may comprise graphic overlay segments extending upward and inward along the sides of the image so as to be indicative of segments extending rearward from the sides of the vehicle. The graphic overlay segments may be viewed by the driver as having a virtual height dimension to enhance the driver's cognitive awareness of the graphic overlays. The graphic overlay segments may be displayed as three dimensional graphic overlay segments having a virtual height and a virtual thickness.

The camera or image sensor of the imaging system may include or utilize a wide angle lens that is compact, durable and inexpensive to manufacture. The image sensor and lens assembly of the present invention thus may comprise a wide angle lens or lens assembly, such as a multi-element lens assembly having multiple optics to provide a wide angle field of view with reduced distortion. Optionally, the lens may include multiple optics, such as four to seven optic elements, with an outer element (the element at the rearwardmost end of the lens and exposed at the rear exterior of the vehicle) comprising a glass element and with at least one other element comprising a plastic aspheric element.

These and other objects, advantages, purposes, and features of this invention will become apparent upon review of the following specification in conjunction with drawings.

BRIEF DESCRIPTION OF THE DRAWINGS

FIG. 5A is a perspective side view of the vehicle and overlay of FIG. 5;

FIG. 10A is a perspective side view of the vehicle and overlay of FIG. 10;

FIG. 11A is a perspective side view of the vehicle and overlay of FIG. 11;

DESCRIPTION OF THE PREFERRED EMBODIMENTS

Figure 1:
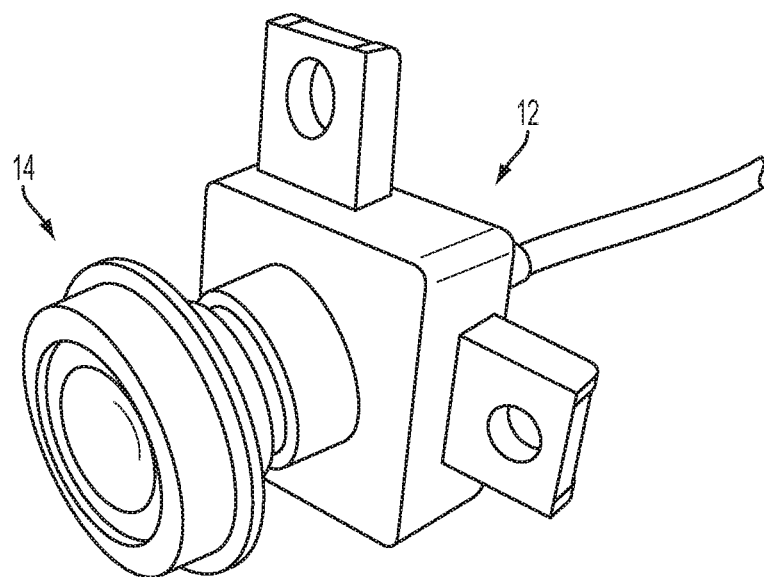
FIG. 1 is a perspective view of an imaging device comprising an image sensor and lens in accordance with the present invention.
Figure 2:
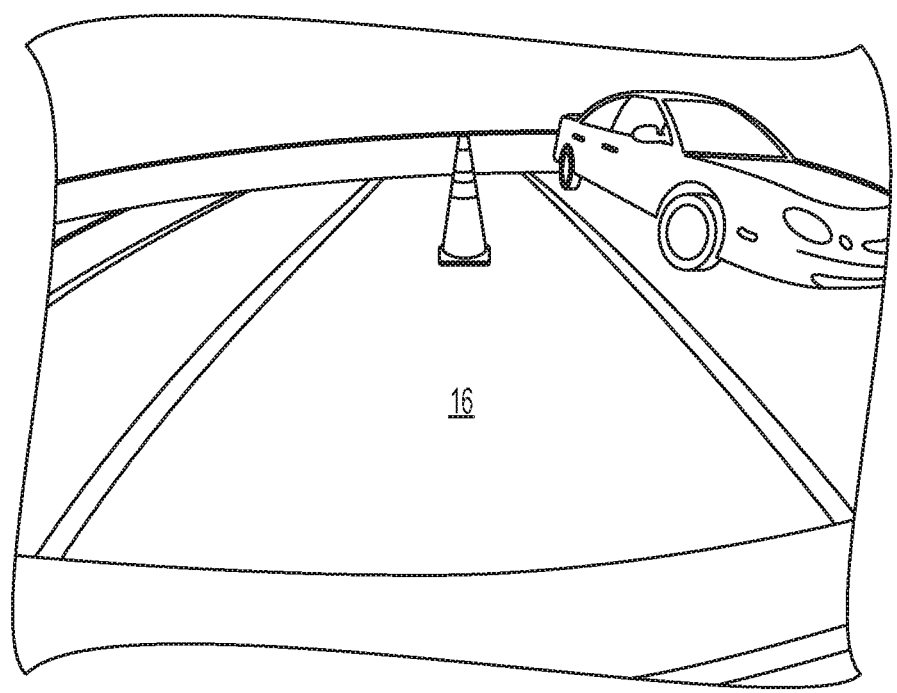
FIG. 2 is an image as displayed to a driver of the vehicle in accordance with the present invention.

Referring now to the drawings and the illustrative embodiments depicted therein, a wide angle imaging system provides an operator of a vehicle with scenic information of an area immediately exteriorly, such as rearwardly, of the vehicle, which may be an automobile, a light truck, a van, a large truck, a sport utility vehicle or the like. The imaging system includes an image capture device 12 (FIG. 1) having an imaging sensor and a lens or lens assembly 14 that functions to focus a rearward field of view at an imaging plane of the imaging sensor or camera. Images 16 (FIG. 2) are displayed on a display device or screen with reduced distortion to enhance the driver's viewing and understanding of the displayed images. The rearview imaging system includes an image processor for receiving data signals from the image capture device and superimposing the graphic overlay on the displayed image, as discussed below.

The imaging sensor for the vehicle vision system of the present invention may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,038,577 and 7,004,606; and/or U.S. patent application Ser. No. 11/315,675, filed Dec. 22, 2005 and published Aug. 17, 2006 as U.S. Patent Publication No. US-2006-0184297; and/or Ser. No. 10/534,632, filed May 11, 2005 and published Aug. 3, 2006 as U.S. Patent Publication No. US-2006-0171704; and/or U.S. provisional applications, Ser. No. 60/845,381, filed Sep. 18, 2007; and Ser. No. 60/837,408, filed Aug. 11, 2006, and/or PCT Application No. PCT/US2003/036177 filed Nov. 14, 2003 and published Jun. 3, 2004 as PCT Publication No. WO 2004/047421, which are all hereby incorporated herein by reference in their entireties. The control may include a lens element or optic between the image sensor and the forward scene to substantially focus the scene at an image plane of the image sensor. Optionally, the optic may comprise a wide angle lens that provides a proportionally distributed central portion of the imaged scene while providing classical optical distortion on the periphery of the imaged scene. Optionally, the optic may comprise a non-flat field curvature, which may focus a generally central portion of the imaged scene onto the image sensor, while providing reduced but acceptable focus on the periphery of the imaged scene. The imaging device may comprise an image sensing module or the like, and may utilize aspects described in U.S. patent application Ser. No. 10/534,632, filed May 11, 2005 and published Aug. 3, 2006 as U.S. Patent Publication No. US-2006-0171704; and/or PCT Application No. PCT/US2006/041709, filed Oct. 27, 2006 and published May 10, 2007 as International Publication No. WO 07/053404; and/or PCT Application No. PCT/US2003/036177 filed Nov. 14, 2003 and published Jun. 3, 2004 as PCT Publication No. WO 2004/047421, which are hereby incorporated herein by reference in their entireties.

Such imaging sensors or cameras are pixelated imaging array sensors having a photosensing array of a plurality of photon accumulating or photosensing light sensors or pixels, which are arranged in a two-dimensional array of rows and columns on a semiconductor substrate. The camera established on the substrate or circuit board includes circuitry that is operable to individually access each photosensor pixel or element of the array of photosensor pixels and to provide an output or image data set associated with the individual signals to the control, such as via an analog to digital converter. As the camera receives light from objects and/or light sources in the target scene, the control may then be operable to process the signal from at least some of the pixels to analyze the image data of the captured image, as discussed below.

Optionally, the imaging sensor may be suitable for use in connection with other vehicle imaging systems, such as, for example, an object detection system or blind spot detection system, where a blind spot indicator may be operable to provide an indication to the driver of the host vehicle that an object or other vehicle has been detected in the lane or area adjacent to the side of the host vehicle. In such a blind spot detector/indicator system, the blind spot detection system may include an imaging sensor or sensors, or ultrasonic sensor or sensors, or sonar sensor, or radar, or LIDAR or sensors or the like. For example, the detection system may utilize aspects of the detection and/or imaging systems described in U.S. Pat. Nos. 7,038,577; 6,882,287; 6,198,409; 5,929,786 and/or 5,786,772, and/or U.S. patent application Ser. No. 11/315,675, filed Dec. 22, 2005 and published Aug. 17, 2006 as U.S. Publication No. US-2006-0184297; and/or Ser. No. 11/239,980, filed Sep. 30, 2005, now U.S. Pat. No. 7,881,496, and/or U.S. provisional applications, Ser. No. 60/696,953, filed Jul. 6, 2006; Ser. No.

60/628,709, filed Nov. 17, 2004; Ser. No. 60/614,644, filed Sep. 30, 2004; and/or Ser. No. 60/618,686, filed Oct. 14, 2004, and/or of reverse or backup aid systems, such as the rearwardly directed vehicle vision systems described in U.S. Pat. Nos. 5,550,677; 5,760,962; 5,670,935; 6,922,292; 6,590,719; 6,201,642; 6,396,397; 6,498,620; 6,717,610; 6,757,109 and/or 7,005,974, and/or of the rain sensors described in U.S. Pat. Nos. 6,250,148 and 6,341,523, and/or of other imaging systems, such as the types described in U.S. Pat. Nos. 7,123,168; 6,353,392 and/or 6,313,454, with all of the above referenced U.S. patents, patent applications and provisional applications and PCT applications being commonly assigned and being hereby incorporated herein by reference in their entireties.

Figure 3:
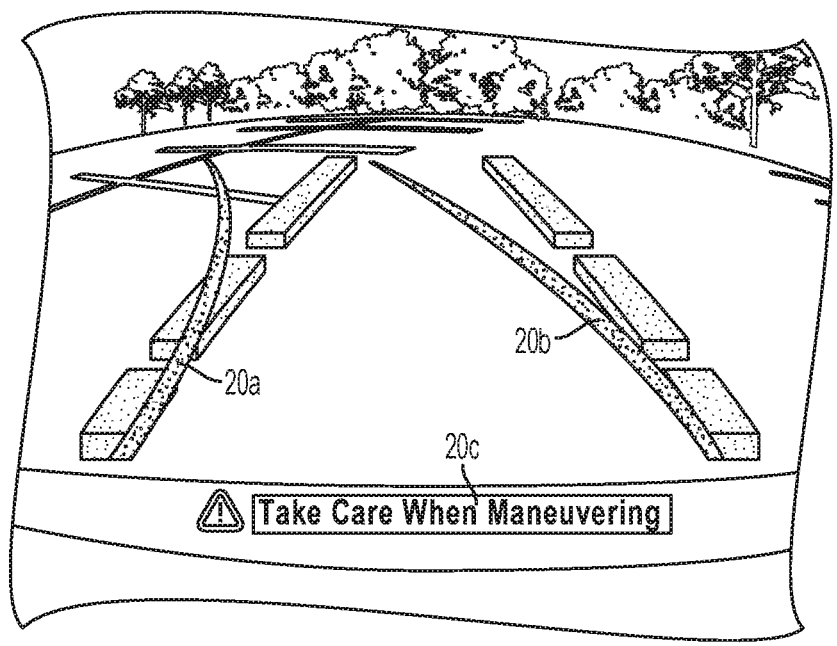
FIG. 3 is another image as displayed to a driver of the vehicle and having a graphic overlay superimposed thereon in accordance with the present invention.

In order to enhance the driver's understanding of what is occurring in the area surrounding the vehicle, the rearview vision system includes a display device or display element having image enhancements (FIG. 3). The display device may comprise any suitable display device or element, such as a video display screen, such as a video display screen utilizing aspects of the display devices described in U.S. Pat. Nos. 5,530,240; 6,329,925; 7,370,983; 7,274,501; 7,255,451; 7,195,381; 7,184,190; 6,690,268; 5,668,663 and/or 5,724,187, and/or in U.S. patent application Ser. No. 10/538,724, filed Jun. 13, 2005 and published Mar. 9, 2006 as U.S. Publication No. US 2006-0050018; Ser. No. 11/226,628, filed Sep. 14, 2005 and published Mar. 23, 2006 as U.S. Publication No. US 2006-0061008; Ser. No. 10/993,302, filed Nov. 19, 2004, now U.S. Pat. No. 7,338,177; and/or Ser. No. 11/520,193, filed Sep. 13, 2006, now U.S. Pat. No. 7,581,859; and/or PCT Application No. PCT/US03/29776, filed Sep. 9, 2003 and published Apr. 1, 2004 as International Publication No. WO 2004/026633; and/or PCT Application No. PCT/US03/35381, filed Nov. 5, 2003 and published May 21, 2004 as International Publication No. WO 2004/042457; and/or PCT Application No. PCT/US2006/018567, filed May 15, 2006 and published Nov. 23, 2006 as International Publication No. WO 2006/124682; and/or PCT Application No. PCT/US2006/042718, filed Oct. 31, 2005 and published May 10, 2007 as International PCT Publication No. WO 2007/053710; and/or PCT Application No. PCT/US03/40611, filed Dec. 19, 2003 and published Jul. 15, 2004 as International Publication No. WO 2004/058540, which are all hereby incorporated herein by reference in their entireties.

In the illustrated embodiment, the image enhancements of the imaging system and/or display device include graphic overlays 20a, 20b which are lines or segments intended to illustrate to the driver the anticipated path of rearward movement of the vehicle based on the present trajectory of the vehicle. In the illustrated embodiment of FIG. 3, the graphic overlays 20a, 20b indicate the anticipated vehicle motion as a function of the vehicle direction of travel as well as the rate of turn of the vehicle. Optionally, the displayed image may have a textual message 20c alerting the driver of a detected object or otherwise instructing the driver during the rearward maneuver.

The forward or rearward direction of vehicle travel is determined in response to the operator placing the gear selection device (not shown) in the reverse gear position. The degree of turn of the vehicle may be determined by monitoring the movement of the vehicle steering system, monitoring the output of an electronic compass, or monitoring the vehicle differential drive system or the like. Optionally, and desirably, if the vehicle is not in reverse gear position, the graphic overlays are not presented. The imaging system and graphic overlays may utilize aspects of the systems described in U.S. Pat. Nos. 5,670,935; 5,949,331; 6,222,447 and 6,611,202, which are hereby incorporated herein by reference in their entireties. Optionally, the graphic overlays may be static overlays (in other words, graphic overlays that extend generally rearwardly toward a focal point of expansion rearward of the vehicle and that are not dependent on a steering wheel angle or the like), while remaining within the spirit and scope of the present invention.

Figure 4:
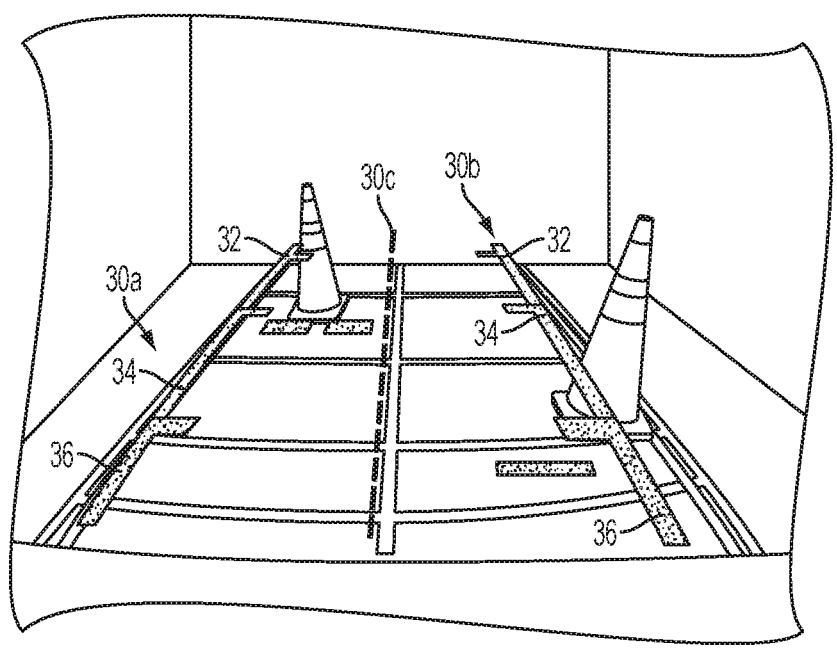
FIG. 4 is another image as displayed to a driver of the vehicle and having a graphic overlay superimposed thereon in accordance with the present invention.
Figure 4A:
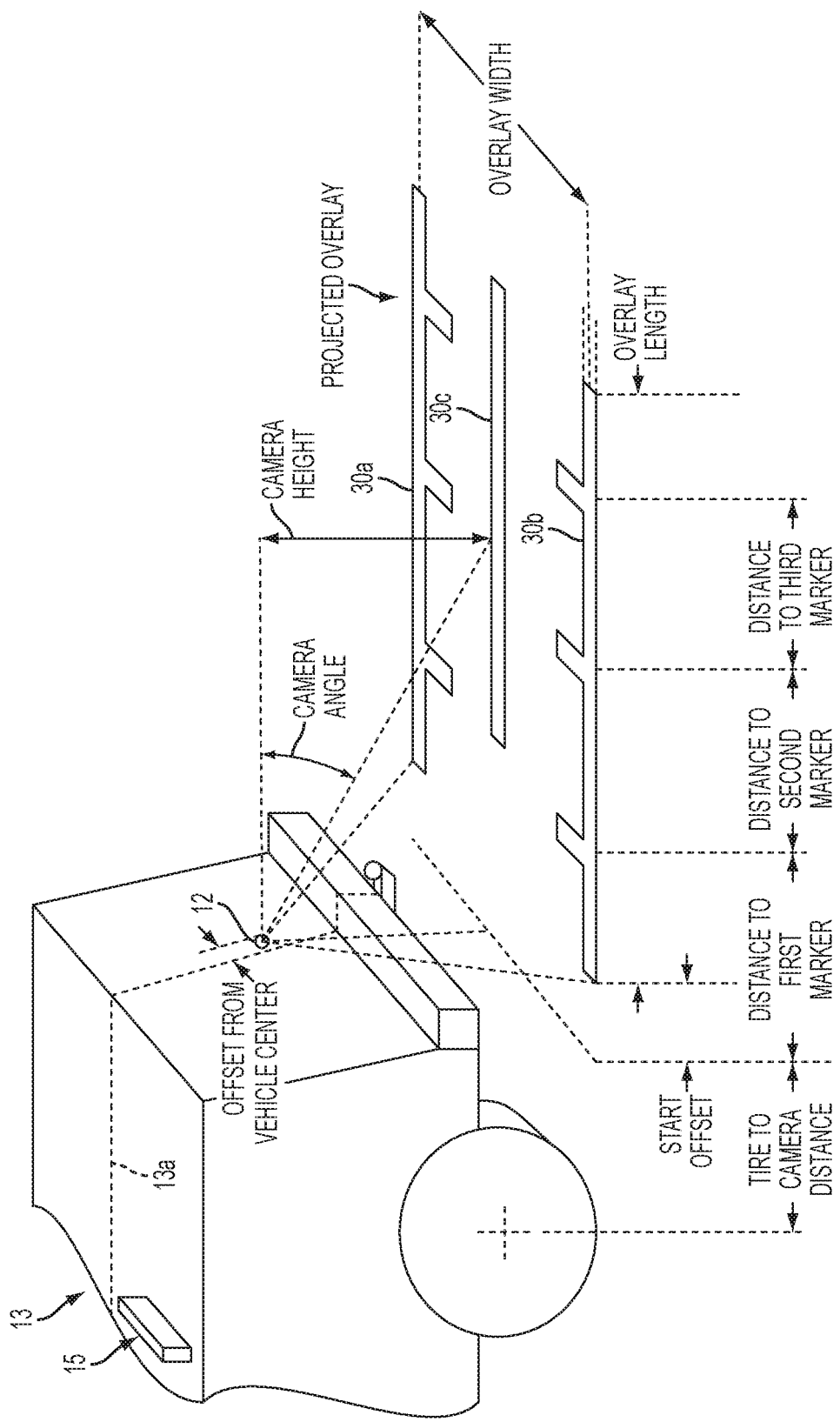
FIG. 4A is a perspective side view of the vehicle and overlay of FIG. 4.

Optionally, and as shown in FIG. 4, the graphic overlays 30a, 30b may function to enhance the driver's awareness of an object detected rearward of the vehicle when the vehicle is shifted into a reverse gear. Optionally, the graphic overlays may include a centrally located overlay 30c, such as a dashed line or the like, that extends upward toward the focal point of expansion of the displayed image. In the illustrated embodiment, each graphic overlay 30a, 30b may be provided in three different colors, such as a green segment 32, a yellow segment 34 and a red segment 36, with the upper or further out segment 32 being green (or other suitable color or pattern), the middle segment 34 being yellow (or other suitable color or pattern), and the closest or lowest segment 36 being red (or other suitable color or pattern). The individual segments may be activated or overlaid in response to a detection of an object rearward of the vehicle and a detected or determined distance between the rear of the vehicle and the detected object.

For example, the rearward imaging system of the present invention may include an imaging sensor for capturing images in a rearward field of view and a display for displaying the images. The system may include or may operate in conjunction with an object detection system for detecting objects rearward of the vehicle and in the path of the vehicle when the vehicle is traveling in reverse (such as, for example, an ultrasonic sensing system, a lidar sensing system or a radar sensing system or via image processing of the captured images or the like). When the vehicle is reversing and no object is detected by the object detection system (or if an object is detected that is further away from the vehicle than a predetermined threshold distance), the graphic overlay or overlays may not be displayed or may be displayed as non-colored or dark or neutral lines or continuous segment or the like (such as similar to the graphic overlays 20a, 20b shown in FIG. 3). As the vehicle approaches the object so that the object is detected by the object detection system (or when a detected object is within a first threshold distance from the rear of the vehicle but outside of a second threshold distance from the rear of the vehicle), the outer graphic overlay segment 32 may flash or may be displayed as green to alert the driver of the presence of the object, while also notifying the driver that the object is still a safe distance rearward of the vehicle. As the vehicle further approaches the object (for example, when the object is within the second threshold distance from the rear of the vehicle but outside of a third threshold distance from the rear of the vehicle), the middle graphic overlay segment 34 may flash or may be displayed as yellow to alert the driver that the vehicle is approaching the object. As the vehicle further approaches the object (for example, when the object is within the third threshold distance from the rear of the vehicle), the inner graphic overlay segment 36 may flash or may be displayed as red to alert the driver that the vehicle is very near to the object.

Optionally, the system may also provide a tone or audible alert when the vehicle and object are within the third threshold separation distance or when the vehicle and object are less than a fourth threshold distance apart to further alert the driver that the object is very near to the vehicle and that the driver should not back up any further. Optionally, the graphic overlays may also or otherwise vary in shape or pattern or thickness or color to enhance the driver's cognitive awareness of the location of and distance to a detected object rearward of the vehicle. Optionally, as one segment is activated or colored (as the object is detected within the respective range from the rear of the vehicle), the other segment or segments may be deactivated or de-colored, so that the driver can readily discern that the object is detected within the particular range encompassed by the currently activated or colored graphic overlay segments.

Optionally, the graphic overlay may be designed to assist colorblind drivers to distinguish the color segments of the overlay. A majority of the colorblind population are "red-green colorblind" and have problems in either in the red or green opsin gene. For example, people with a mutant red opsin gene are called "protanopes", while people with a mutant green opsin gene are called "deuteranopes". It is estimated that for males, about 8 percent of Caucasians, about 5 percent of Asians and about 4 percent of Africans are "red-green" colorblind. Color blindness is typically sex-linked, so a reduced number of females are colorblind. Red-green color blind people have difficulty distinguishing colors between red and green with similar intensity or brightness. To address this problem, for example, the graphic overlays of the present invention may replace the red colored segment or segments in the overlay graphics with a reddish purple or vermilion colored segment or segments, and may replace the green colored segment or segments with a blue or bluish green segment or segments. Such colors may be recognized and discerned by a typical red-green colorblind person (the yellow colored segments may remain yellow since typical red-green colorblind people would be able to recognize and discern the yellow colored segments). Optionally, different textural features or patterns (such as different stippling or cross-hatching or different degrees of transparency or translucency of the segments or the like) can be used to assist colorblind drivers to distinguish different segments of the graphic overlay.

Optionally, the different colors or features or patterns of the segments may be selectively provided in response to the user or driver selecting the desired or appropriate graphic overlay display scheme. For example, a software or hardware toggle switch or other suitable user actuatable input (such as a button or a voice recognition system or the like) may be implemented to allow the user or driver of the vehicle to select a suitable overlay color scheme, such as a display displaying normal colored graphic overlays for non-colorblind drivers or a display displaying modified graphic overlays (such as a different color scheme or a different texture or pattern scheme or the like) for colorblind drivers. The switch may offer different choices for the user, such as a color scheme for a red-green colorblind person or a different color scheme for other types of colorblindness (whereby the system adjusts the color scheme of the graphic overlays accordingly).

Optionally, and with reference to FIGS. 5-14, the present invention provides a graphic overlay to assist the driver of the vehicle to back up to a trailer hitch or the like. Optionally, and desirably, the camera or image sensor at the rear of the subject vehicle may be offset from the centerline of the vehicle and angled so as to have its field of view be generally rearward and toward the centerline of the vehicle. Such a camera orientation allows for a three-dimensional or perspective image of a trailer hitch alignment graphic overlay that may be imaged so as to appear to extend rearward from the rear of the vehicle and generally along the centerline of the vehicle.

Figure 5:
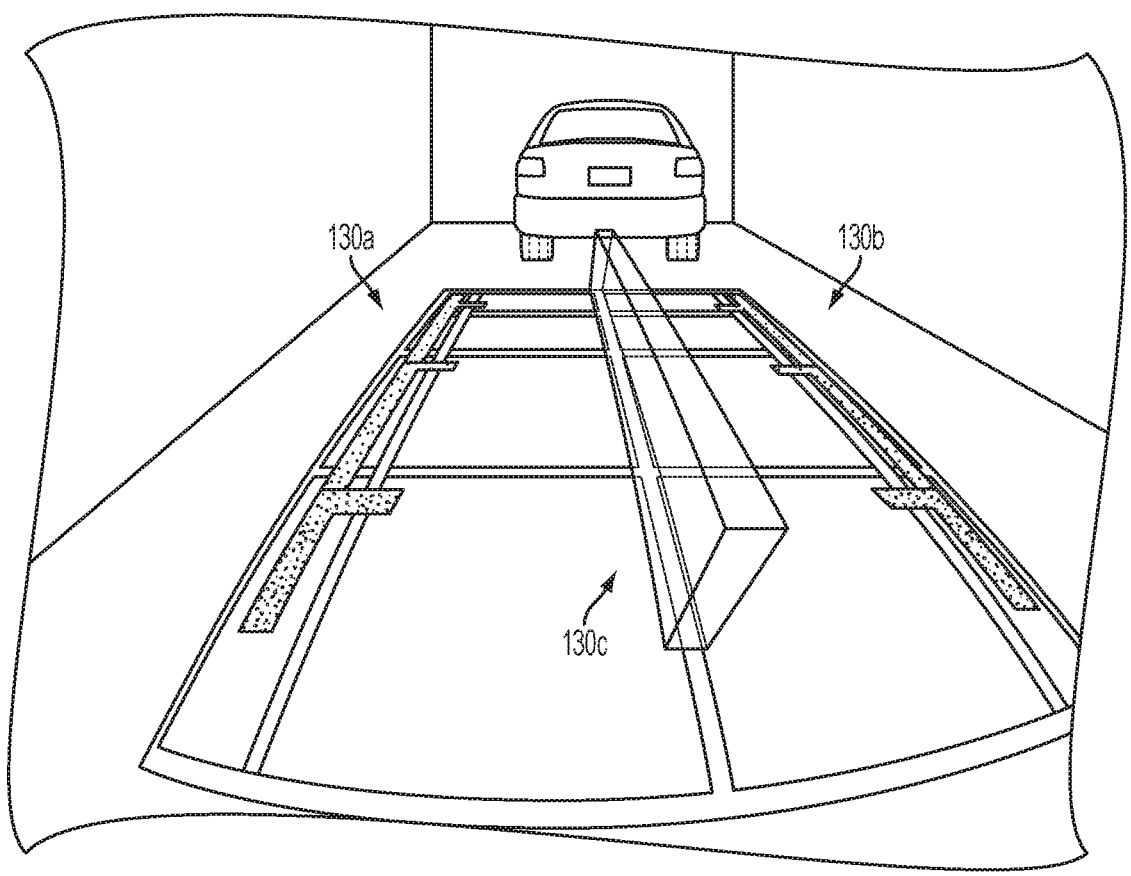
FIG. 5 is another image as displayed to a driver of a vehicle and having a trailer hitch graphic overlay superimposed thereon in accordance with the present invention.

For example, and as shown in FIG. 5, a graphic overlay includes a pair of sideward overlays 130$a$, 130$b$ and a generally centrally located trailer hitch alignment overlay 130$c$. The side overlays 130$a$, 130$b$ may be substantially similar to the side overlays 30$a$, 30$b$, discussed above, and may have colored segments and the like, such that a detailed discussion of the side overlays need not be included herein. The hitch alignment overlay 130$c$ is generally at or near the center of the displayed image and extends upward toward the focal point of expansion of the displayed image. The side overlays 130$a$, 130$b$ may function as described above, and may be activated or generated or displayed when the vehicle is shifted into reverse, while the hitch alignment overlay 130$c$ may be similarly activated or generated or displayed, or may be activated or generated or displayed in response to a user input, such as a control input or button or the like that is activated by the driver of the vehicle when the driver is about to back up the vehicle to a trailer (or may be automatically activated or generated or displayed in response to the system detecting or identifying a trailer rearward of the vehicle when the vehicle is traveling in reverse), while remaining within the spirit and scope of the present invention.

As can be seen in FIG. 5, the displayed image is captured by an image sensor that is offset from the centerline of the vehicle and is directed rearward and toward the centerline of the vehicle. In the illustrated embodiment, image sensor is disposed about 305 mm offset from the centerline of the vehicle at about 875 mm above the ground and oriented at an angle of about 40 degrees toward the centerline of the vehicle. The hitch alignment overlay 130$c$ is displayed as a three-dimensional shape that extends upward in the image and generally along the centerline of the vehicle and toward the focal point of expansion of the camera. The hitch alignment overlay 130$c$ is generated so as to appear to be a three dimensional object at the rear of the vehicle (such as an object or alignment element having a height of about 440 mm or thereabouts to approximate a height of a hitch of the vehicle). Thus, the alignment overlay provides two planes, one generally at the ground level and one generally at a typical trailer hitch height.

Other mounting locations and angles for the camera and/or other dimensions of the graphic overlays may be implemented without affecting the scope of the present invention. Because the camera is preferably disposed at a height greater than the virtual height of the alignment element/overlay, the displayed image provides a perspective view rearward and downward toward the three dimensional alignment overlay so that the driver can readily discern and understand the alignment overlay to assist the driver in reversing the vehicle toward a trailer hitch of a trailer or the like. The alignment overlay and the offset camera thus provide a scaled and distorted three dimensional image to provide the driver improved depth perception for driving the vehicle toward the trailer or other targeted object.

Figure 6:
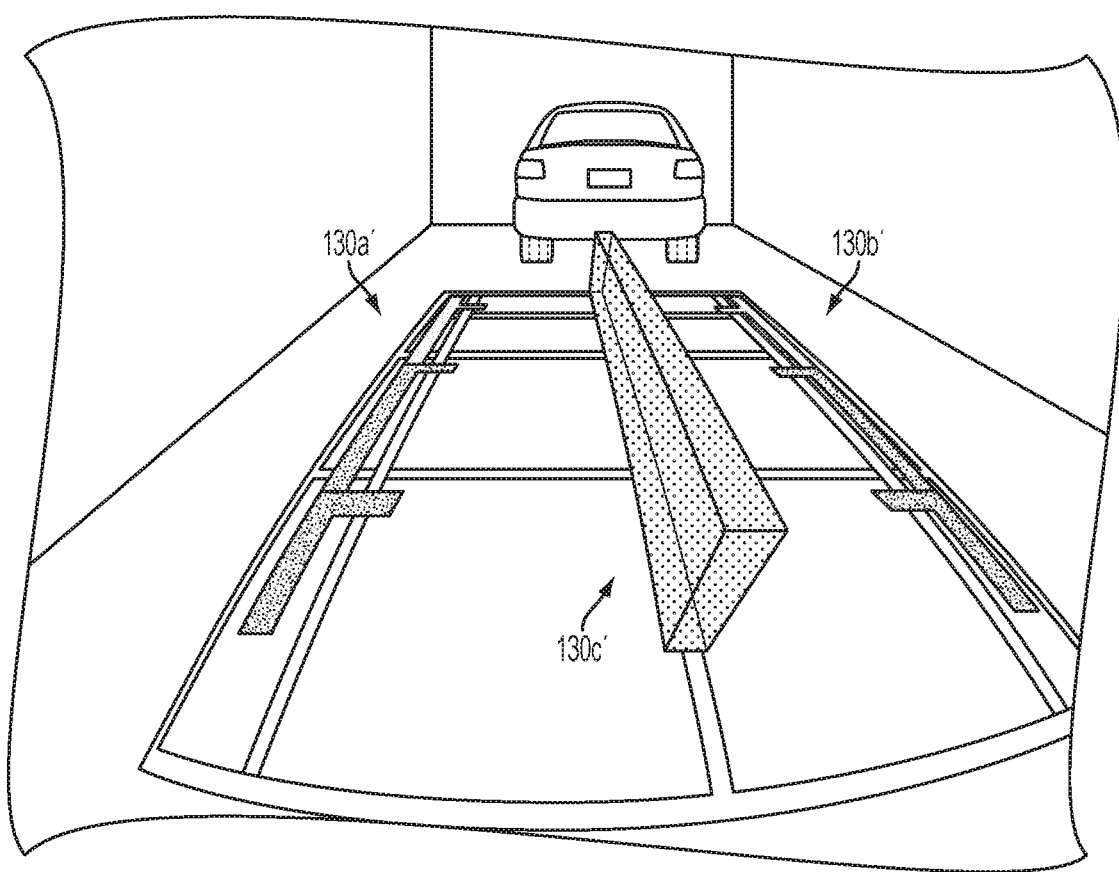
FIG. 6 is an image as displayed to a driver of a vehicle and having another trailer hitch graphic overlay superimposed thereon in accordance with the present invention.
Figure 6A:
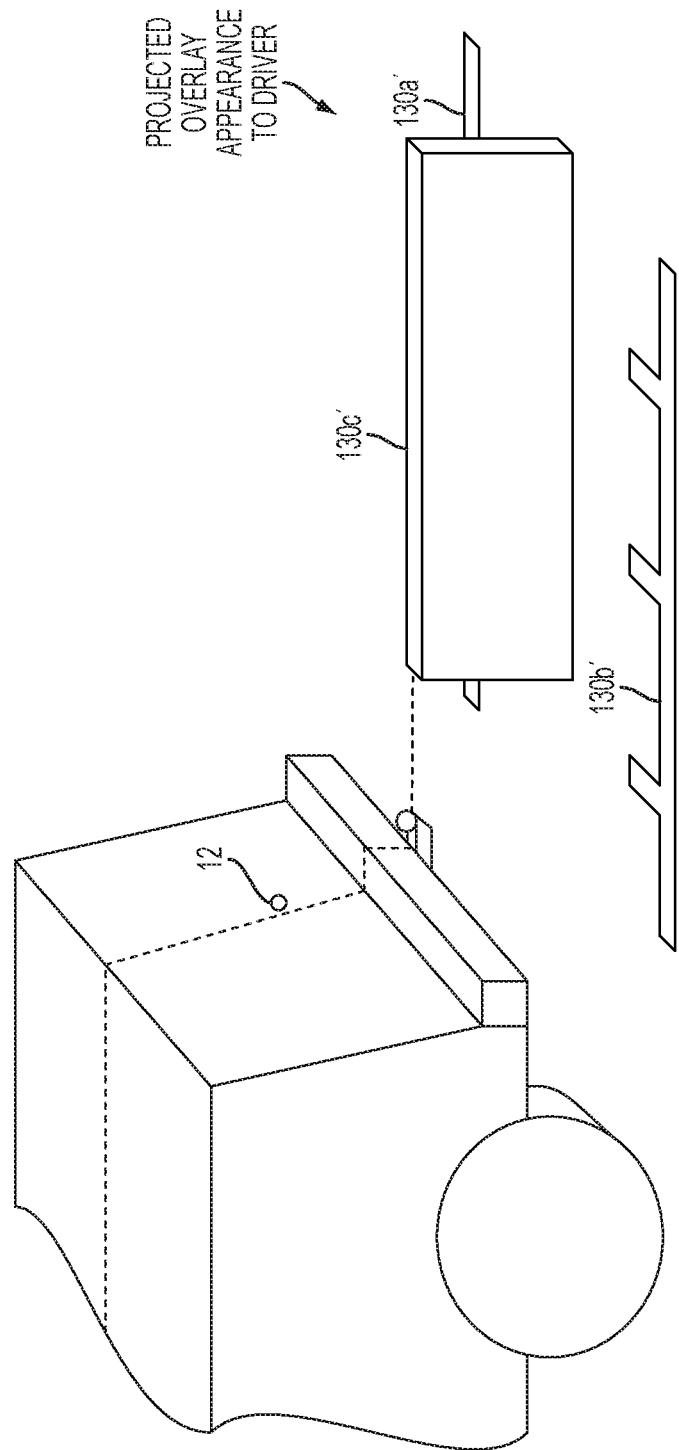
FIG. 6A is a perspective side view of the vehicle and overlay of FIG. 6.
Figure 7:
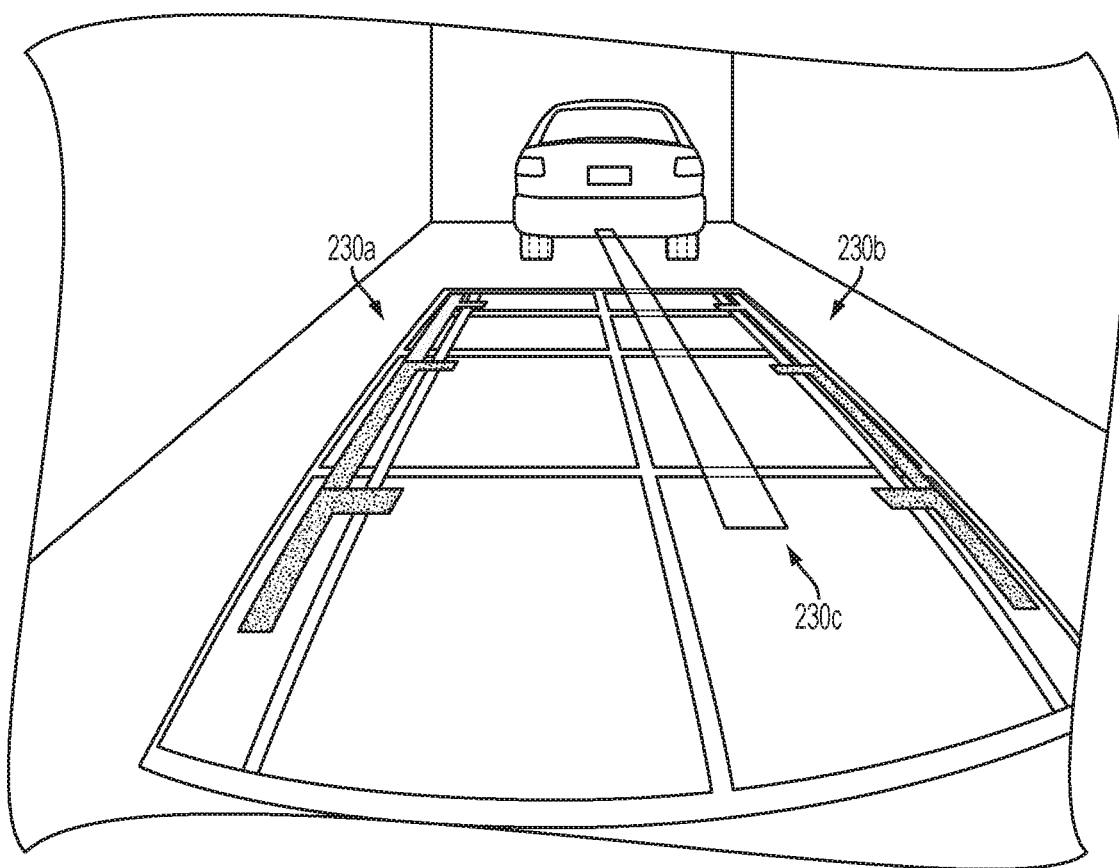
FIG. 7 is an image as displayed to a driver of a vehicle and having another trailer hitch graphic overlay superimposed thereon in accordance with the present invention.
Figure 8:
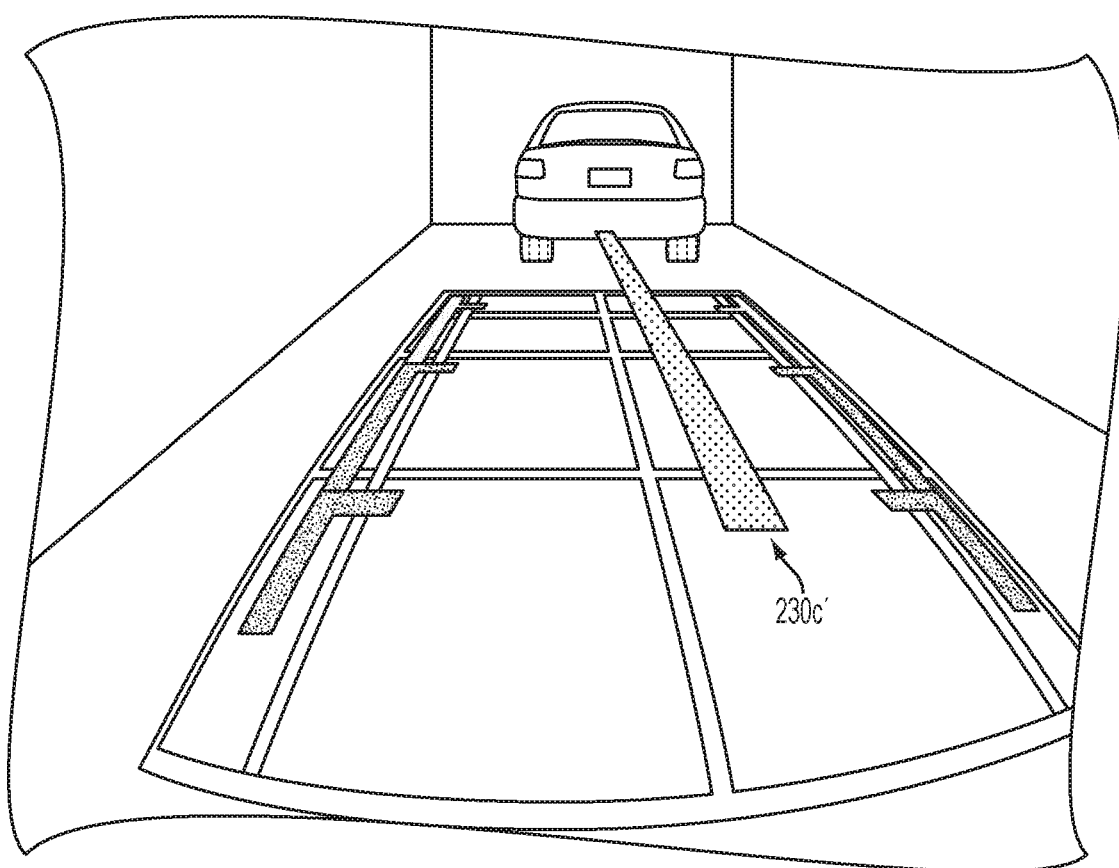
FIG. 8 is an image as displayed to a driver of a vehicle and having another trailer hitch graphic overlay superimposed thereon in accordance with the present invention.
Figure 9:
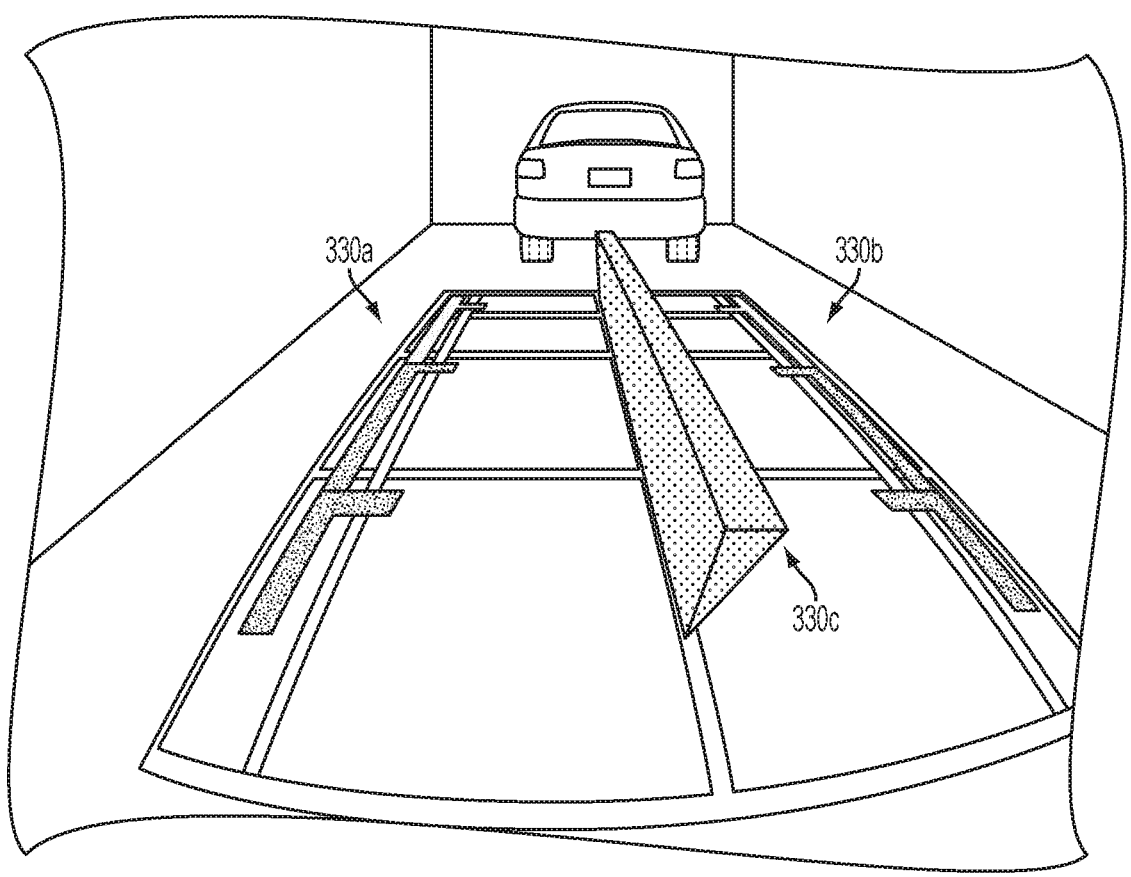
FIG. 9 is an image as displayed to a driver of a vehicle and having another trailer hitch graphic overlay superimposed thereon in accordance with the present invention.

In the illustrated embodiment of FIG. 5, alignment overlay 130$c$ is a wire frame or line drawing or representation of a perspective view of a three dimensional rectangular form. However, other shapes or forms may be utilized to provide the desired perspective or view to the driver to assist the driver in reversing the vehicle toward a trailer hitch or other object. For example, and as shown in FIG. 6, the side overlays 130$a'$, 130$b'$ may be similar to side overlays 130$a$, 130$b$, discussed above, while the alignment overlay 130$c'$ may be a solid or colored three dimensional rectangular form to further enhance the viewability and discernability of the alignment overlay to the driver of the vehicle. Optionally, for example, and as shown in FIG. 7, the side overlays 230a, 230b may be similar to side overlays 130a, 130b, discussed above, while the alignment overlay 230c may be a generally planar, two dimensional rectangular form (such as only the upper portion or surface of the three dimensional rectangular form of alignment overlay 130c, discussed above), which may be a wire form representation (as shown in FIG. 7), or the alignment overlay 230c' may be a solid or colored representation (as shown in FIG. 8), depending on the particular application and desired appearance of the alignment overlay in the displayed image. Optionally, and as shown in FIG. 9, the side overlays 330a, 330b may be similar to side overlays 130a, 130b, discussed above, while the alignment overlay 330c may be a prism or wedge shaped form having an upper surface (such as a surface or portion similar to the upper region of the alignment overlay 130c, discussed above) and a shape that tapers or narrows downward to generally a pointed or narrowed lowered portion, to further enhance the perspective view of the alignment overlay. The alignment overlay 330c may be colored or shaded or solid (as shown in FIG. 9), or may be a wire form representation or the like, without affecting the scope of the present invention.

Figure 10:
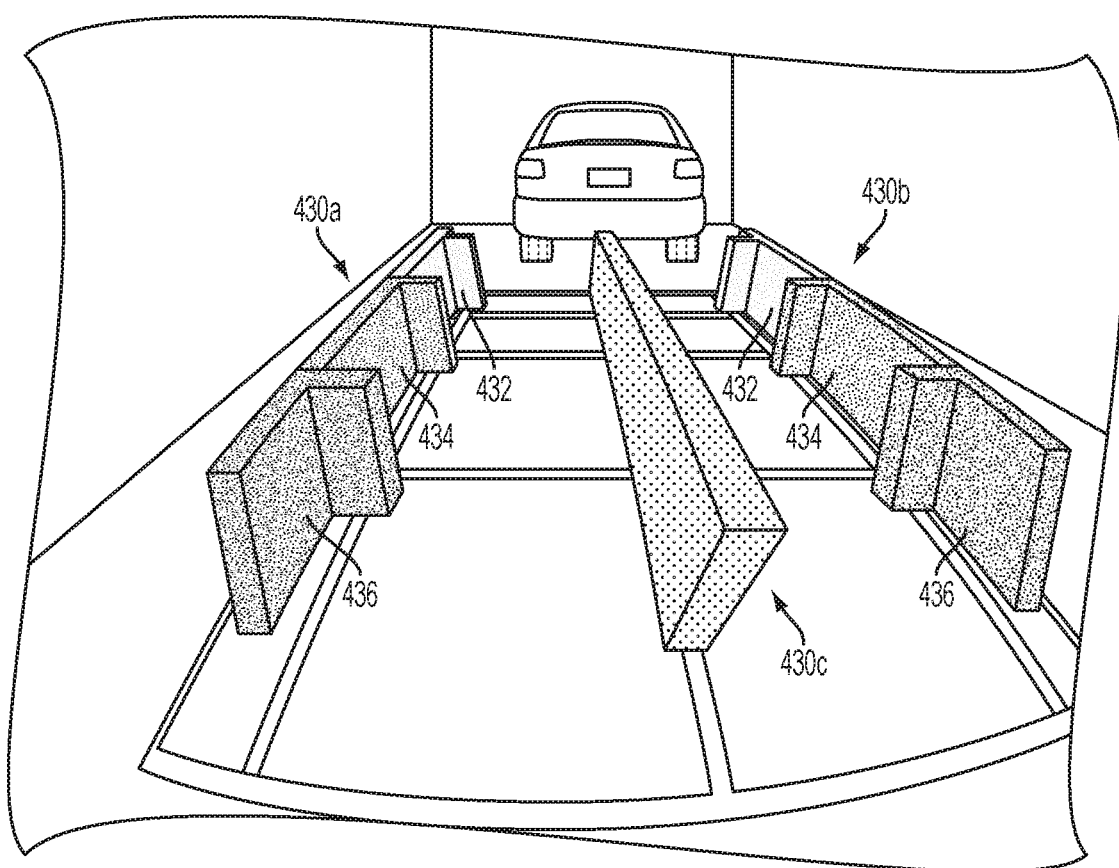
FIG. 10 is an image as displayed to a driver of a vehicle and having another trailer hitch graphic overlay superimposed thereon in accordance with the present invention.
Figure 11:
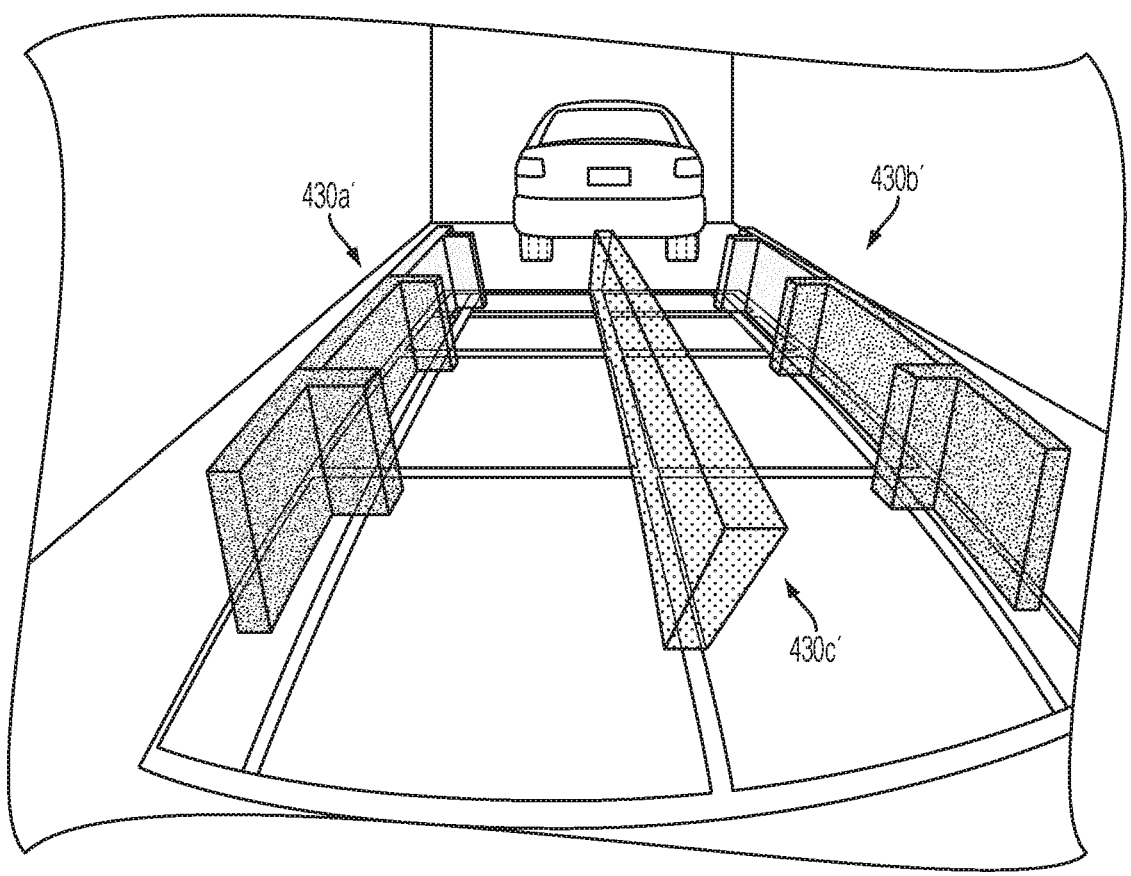
FIG. 11 is an image as displayed to a driver of a vehicle and having another trailer hitch graphic overlay superimposed thereon in accordance with the present invention.
Figure 12:
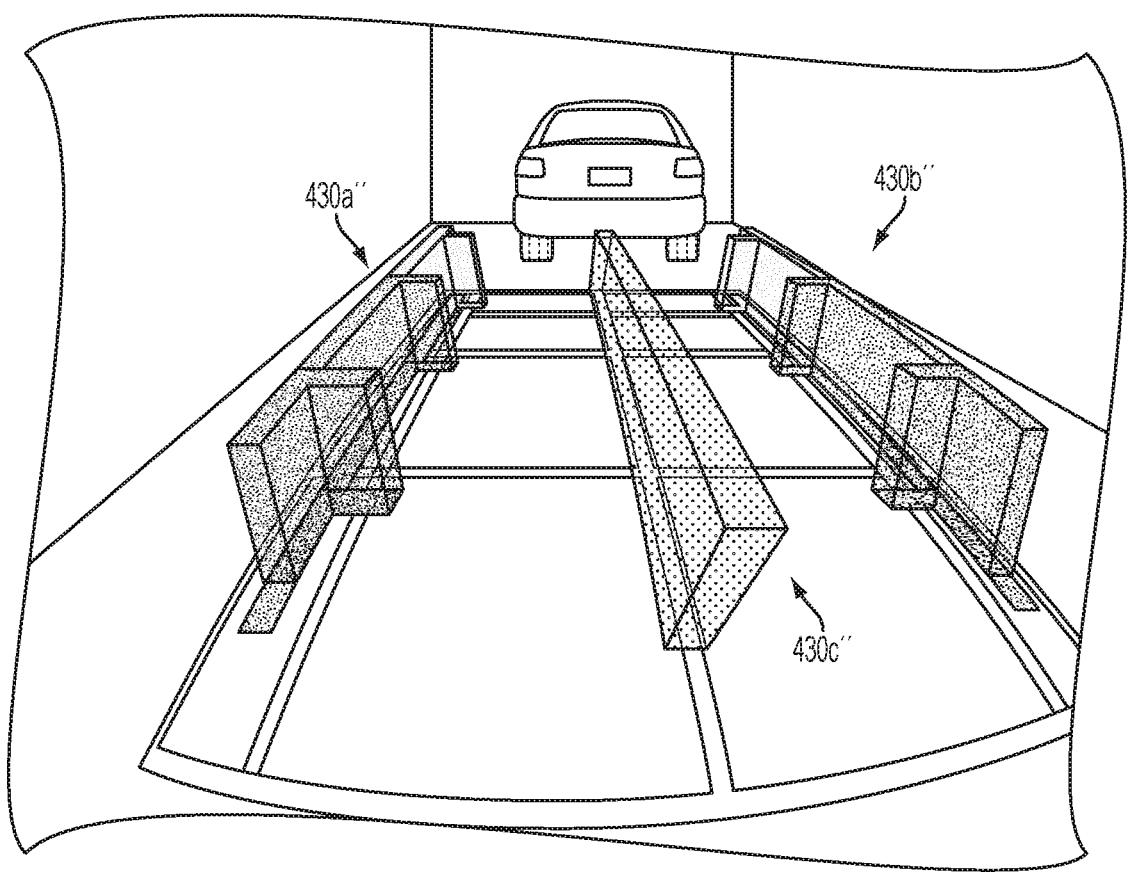
FIG. 12 is an image as displayed to a driver of a vehicle and having another trailer hitch graphic overlay superimposed thereon in accordance with the present invention.
Figure 13:
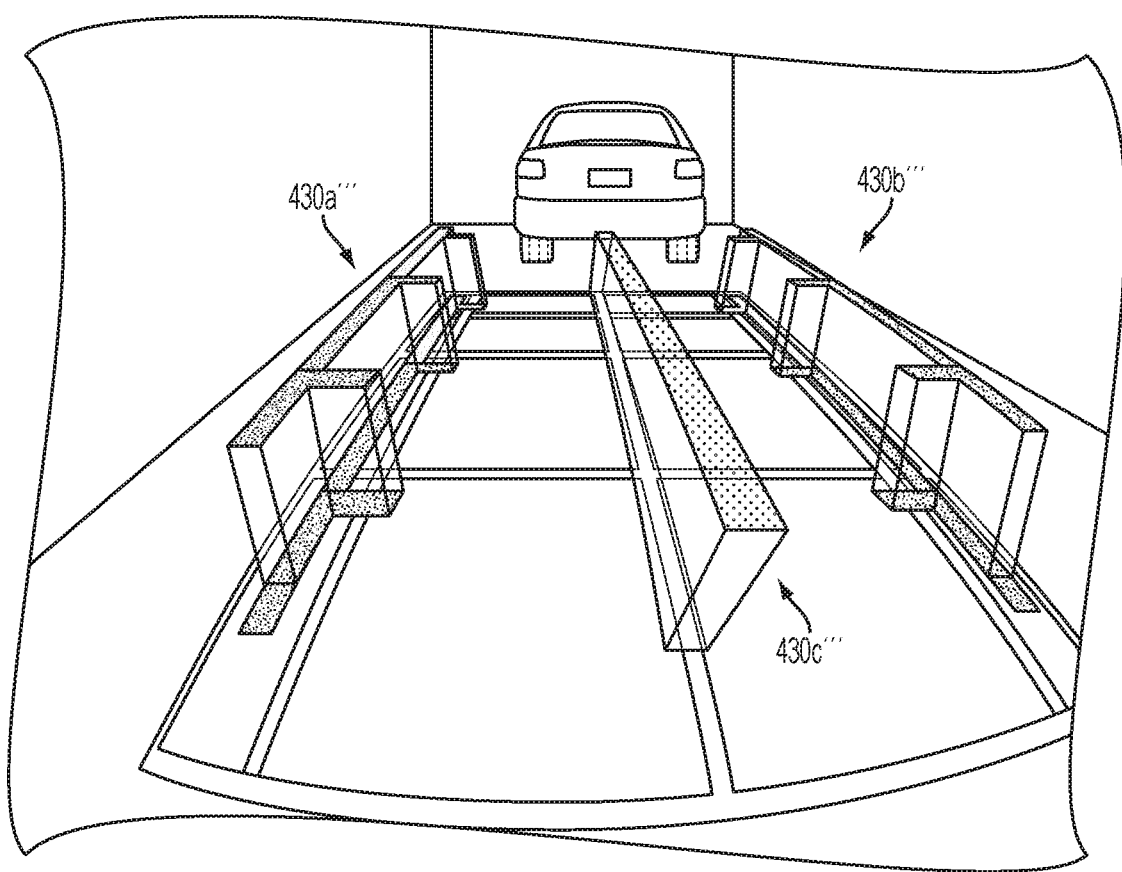
FIG. 13 is an image as displayed to a driver of a vehicle and having another trailer hitch graphic overlay superimposed thereon in accordance with the present invention.
Figure 14:
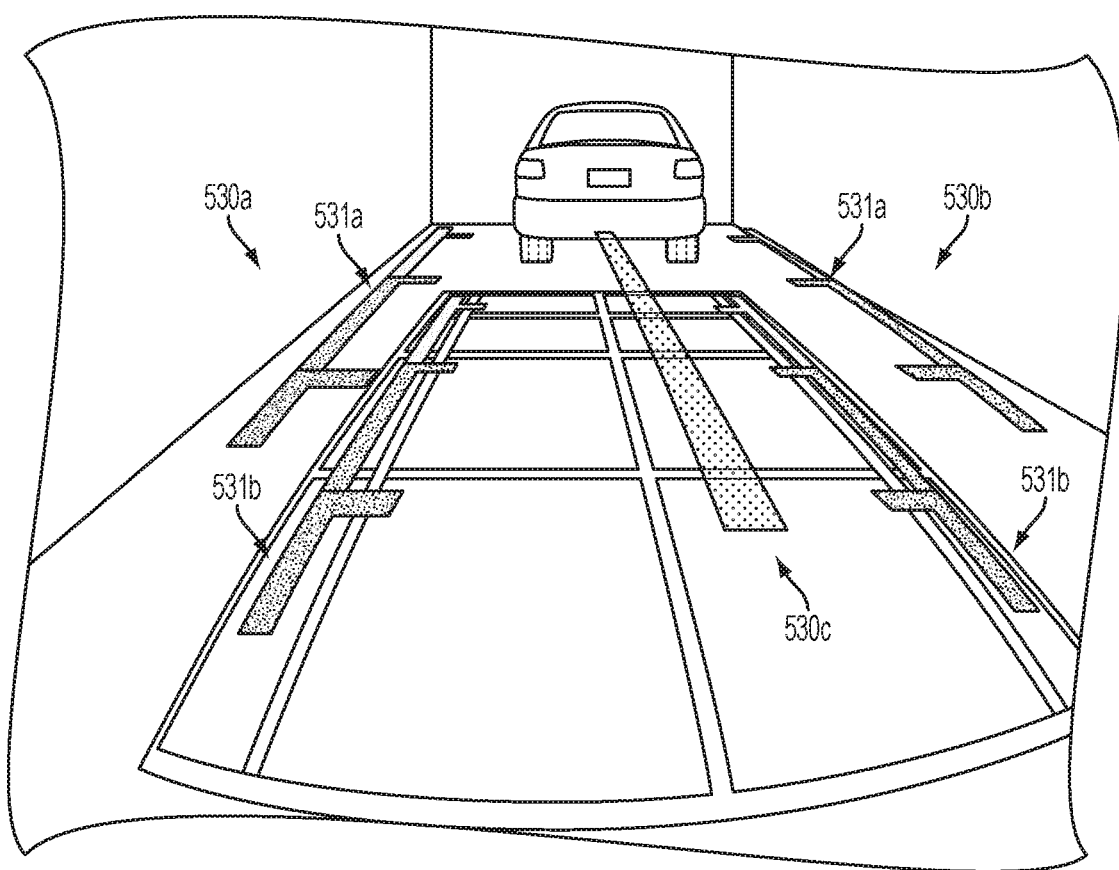
FIG. 14 is an image as displayed to a driver of a vehicle and having another trailer hitch graphic overlay superimposed thereon in accordance with the present invention.

Optionally, the side overlays may also be represented or generated or displayed three dimensionally to further assist the driver of the vehicle during the rearward maneuver. For example, and as shown in FIG. 10, the side overlays 430a, 430b may appear as three dimensional colored or shaded or solid "walls" extending rearward from the vehicle to assist the driver in guiding or driving the vehicle toward the trailer or targeted object. The side overlays 430a, 430b may be otherwise similar to side overlays 30a, 30b, and may have colored segments 432, 434, 436 or the like, such as discussed above (optionally, the alignment overlay 430c may be similarly colored or patterned if desired). Optionally, and as shown in FIG. 11, the side overlays 430a', 430b' and alignment overlay 430c' may be displayed as wire frame representations and/or as partially transparent colored representations so as to provide the desired color and enhanced viewability and discernability while limiting or reducing any potential interference with the driver's view of other objects in the displayed image. Optionally, and as shown in FIG. 12, the side overlays 430a", 430b" and alignment overlay 430c" may be displayed as wire frame representations and/or as partially transparent colored representations, while the side overlays 430a", 430b" may include a lower portion that is substantially similar to side overlays 30a, 30b to further enhance the viewability and discernability of the side overlays while limiting or reducing any potential interference with the driver's view of other objects in the displayed image. Optionally, and as shown in FIG. 13, the side overlays 430a''', 430b''' and alignment overlay 430c''' may be displayed as wire frame representations and/or as partially transparent colored representations, while the side overlays 430a''', 430b''' may include a lower portion that is substantially similar to side overlays 30a, 30b and an upper portion that is also colored or shaded to generally correspond with the lower portion of the side overlays, in order to provide enhanced viewability and discernability of the side overlays while further limiting or reducing any potential interference with the driver's view of other objects in the displayed image. Optionally, and as shown in FIG. 14, the side overlays 530a, 530b may have an upper portion 531a and a lower portion 531b similar to side overlays 430''', 430''', but may not have the wire form or shaded region therebetween. The upper and/or lower portions 531a, 531b of side overlays 530a, 530b may have colored segments to assist in indicating a distance to the targeted object. Optionally, and as also shown in FIG. 14, the hitch alignment overlay 530c may comprise a two dimensional rectangular form (either shaded or colored or wire form), such as described above. Although several optional configurations and combinations of side overlays and center hitch alignment overlays are shown in FIGS. 4-14, clearly other combinations and configurations may be implemented while remaining within the spirit and scope of the present invention.

The side overlays and the alignment overlay may be static overlays or may be adjusted or curved or reconfigured (such as in response to a steering wheel angle of the vehicle or the like) to provide a dynamic overlay when the vehicle is being driven in reverse toward the trailer or targeted object. The side overlays and the centrally located alignment overlay may be activated or generated or displayed in response to a user input, such as a button or other control input that is activated by the driver of the vehicle when it is desired to back up the vehicle toward a targeted object or trailer hitch. Optionally, for example, the displayed image may be activated in response to the vehicle being shifted into reverse and may include side overlays 30a, 30b (discussed above), and may provide the three dimensional side overlays and the centrally located hitch alignment overlay in response to the user input. The side overlays and/or the centrally located hitch alignment overlays may be displayed in different colors or different intensities or may be intermittently displayed or the like based on a distance between the vehicle and the trailer hitch or targeted object, such as discussed above with respect to side overlays 30a, 30b, while remaining within the spirit and scope of the present invention.

Thus, the imaging system and graphic overlays of the present invention provide enhanced cognitive awareness by the driver of any objects detected rearward of the vehicle when the vehicle is shifted into a reverse gear and as the driver drives the vehicle in a reverse direction. The change in color or change in intensity or intermittent actuation of the graphic overlays on a segment-by-segment basis provides both a spatial cue to the driver of the presence of and proximity of an object rearward of the vehicle and a spectral cue to the driver of the presence of and proximity of an object rearward of the vehicle, so that the driver is readily aware of an object that is detected rearward of the vehicle and is readily aware of the proximity of the detected object to the rear of the vehicle. The centrally located hitch alignment overlay further enhances the discernability of the location of trailer hitch or targeted object to further assist the driver in maneuvering the vehicle in a rearward direction toward the trailer hitch or targeted object.

Optionally, and preferably, the image sensor includes or utilizes a wide angle lens that focuses a wide angle rearward field of view (such as a wide angle field of view of preferably greater than 120 degrees wide and more preferably greater than 135 degrees wide and more preferably at least about 145 degrees wide) onto an image plane of the image sensor. The wide angle lens preferably comprises a multi-element lens having multiple lens optics or elements, such as seven optics arranged along an optic path to focus the rearward wide angle field of view at the imaging plane while reducing distortion of the focused image. For example, the wide angle lens may include seven optic elements, with some of the elements being glass elements (such as an outer wide angle element being a glass element) and some of the elements being plastic elements. Preferably, at least one of the optic elements comprises a plastic aspheric element, and more preferably, two of the optic elements comprise plastic aspheric elements and five of the optic elements comprise glass spherical elements. Such a lens assembly may utilize aspects of the lenses described in U.S. Pat. Nos. 6,922,292; 6,757,109; 6,590,719 and 6,201,642, which are hereby incorporated herein by reference in their entireties.

The lens of the present invention thus may have at least one plastic element, which may provide a cost savings and a reduction in overall lens length. The refractive or diffractive lens element or elements may be made by injection molding or other low cost means. The plastic lens elements may comprise a polycarbonate material or acrylic material or any other suitable plastic or polymeric material. The lens includes non-spherical, refractive or diffractive optic elements, and may have a stop or aperture within the lens to correct distortion in the focused image.

For example, a lens assembly may be provided that is approximately 25 to 26 mm in overall length (from the image plane to the outer end of the lens assembly. The lens elements may be provided in a housing or barrel (such as an aluminum barrel) that may be threaded onto the circuit board that has the image sensor established thereon or threaded onto a housing or mounting portion of an image sensor module. The lens may have a cap diameter of about 12 mm to about 23 mm, with about a 1.0 to 2.5 mm radius on the outer most edge of the lens cap. The lens may provide a wide angle field of view of about 130 degrees in the horizontal and about 105 degrees vertical when the image sensor and lens are mounted at the vehicle, and may have an active sensor area having about a 3.584 mm horizontal dimension and about a 2.688 mm vertical dimension and about a 4.480 diagonal dimension.

The image sensor may comprise a pixelated image sensor (such as a CMOS sensor or the like) having a 640×480 array (or other size array depending on the particular application) of pixels that are about 5.6 µm×5.6 µm. The lens may provide an "F-stop" of about 2.0 (or lower)+/−5 percent, and may have a relative illumination at greater than 50 percent at full field. Preferably, the lens provides a reduced or lowered optical distortion (geometrical), preferably better than about −45 percent. The lens may have a modulation transfer function (a measurement of lens resolution quality) of greater than about 0.6 at 45 lp/mm on lens axis (zero degrees) and greater than about 0.25 at 45 lp/mm off-axis (between zero degrees and 60 degrees).

The lens preferably includes an integrated infrared (IR) cutoff coating or filter that provides about 85 percent or greater transmission of light therethrough over the visible spectrum (about 400 nm to about 700 nm) of light, and about 50 percent or lower transmission of light therethrough for light having wavelengths greater than about 700 nm and less than about 400 nm. The lens may provide a wide angle field of view and may be able to focus on an object within about 30 cm or thereabouts from the outer end of the lens. The lens preferably has an anti-reflective (AR) coating on at least some of the surfaces of the optic elements and preferably on all of the surfaces of the optic elements. The lens may have a variation of effective focal length of less than +/−5 percent. The lens preferably has an image circle diameter of greater than about 4.8 mm and the angle between the lens' optical axis and a barrel reference diameter axis is preferably less than about 1.5 degrees.

The lens is robust and capable of withstanding the extreme climate and environmental conditions that it may encounter at the exterior portion of a vehicle. For example, the lens may be operational at up to about 85 degrees Celsius, and may be able to withstand exposure up to 125 degrees Celsius. The lens is capable of withstanding high temperature and high humidity endurance tests and can withstand exposure at 95 degree Celsius and 85 percent relative humidity for 1200 hours or more. The lens is also capable of withstanding mechanical shock tests (such as 6 shock pulses with 100 g and 10 ms half-sine pulses, one in each opposite direction of three perpendicular axes) and vibration tests (such as a vibration test of an RMS acceleration value of about 27.8 m/s$^2$ for about 27 hours in the x-axis, about 27 hours in the y-axis and about 81 hours in the z-axis. Because the outer optic element is exposed to harsh conditions at the rear of the vehicle, the lens comprises a sealed lens and is capable of passing the required OEM testing, such as a car wash spray test and a heavy splash shower test and a mist test and a salt mist test and a dust test and the like. The lens can also withstand a dunk or soak test where the lens is soaked in 95 degrees Celsius water for at least 1 hour and then the upper body of the lens is dunked or soaked in icy water at a depth of 15 cm for at least 30 minutes. The lens is also capable of withstanding exposure to various chemicals. For example, the outer glass surface of the lens and the outer exterior body of the lens may be resistant to automatic transmission fluid, hypoid lubricant, hydraulic fluid, power steering fluid, differential lubricant, central hydraulic fluid, engine oil, engine wax protective, engine coolant/Ethylene Glycol, gasoline, diesel fuel, kerosene, bio-diesel/Methanol based fuel, brake fluid, windshield washer fluid, window glass cleaner, car wash cleaner/soap solution, car wax and silicone protectants, leather wax, battery acid—dilute sulfuric acid, and calcium chloride, and/or other chemicals the lens may encounter at the vehicle assembly plant and/or during its life on the vehicle.

Because the outer glass optic of the lens assembly is positioned toward an exterior of the vehicle such that an outer surface of the outer glass optic may be exposed to the elements outside of the vehicle, the outer surface may be coated with a protective coating to protect the outer optic from deterioration or damage due to exposure to the elements. Such a protective coating may comprise an organic haricot, an inorganic haricot, or an organic/inorganic compound or the like. Additionally, the protective coating may include ultraviolet absorbers or stabilizers to protect the outer optic from UV radiation degradation. Such a coating or other additional coating or coatings substantially reduces the susceptibility of the outer optic to abrasion and/or ultraviolet degradation, thereby providing a substantially clear and durable glass-like appearance to the outer optic. Optionally, the hard coating or protective coating may be of the type described in EPC Application No. 98650039.5, published on Jan. 20, 1999 under Publication No. EP 0892209, the disclosure of which is hereby incorporated herein by reference in its entirety.

Optionally, the outer optic may be heatable to defog or defrost its surfaces. For example, the outer optic may be formed by a glass material and coated with a transparent conductive coating (such as an indium tin oxide (ITO) transparent conductor or a doped tin oxide or the like), or may include a wire mesh or a conductive coating mesh or the like, whereby heat is generated by energizing the conductive coating or mesh via a power source. Optionally, the outer surface of the outer optic may be coated with an anti-soiling or anti-wetting coating, such as a silicone material, which may provide either a hydrophobic or hydrophilic property to the exposed outer surface of the outer optic.

Optionally, the lens body (barrel and optic elements) may be heated electrically to limit or substantially preclude moisture from being trapped inside the lens from condensation. When the lens is assembled in an environment that humidity/moisture level is not tightly controlled below a certain level, the air packet between optic elements inside the lens typically has water molecules in the form of moisture. When the lens is exposed to a temperature that is lower than the dew point temperature of the moisture density level, moisture condensation occurs within the lens, and a small cluster of water droplets may form on the surfaces of the optic elements inside the lens. The condensation or water droplets may blocks or attenuate light passing through the lens and thus may degrade the lens and furthermore may reduce or impair the camera performance. In some situations, the condensation water may drop onto the camera circuitry or circuit board or PCB and may cause an electrical malfunction or electrical shortage. Optionally, a means for measuring the temperature of the lens, such as a temperature sensor, such as a thermal couple or the like, may be used to determine the temperature at or within the lens, while a control means may be responsive to the temperature signal and may activate a heating current or voltage at or in the lens to heat the lens or lens elements above a threshold level in response to a detection or determination that the temperature at or in or of the lens is dropping below the dew point level. Thus, the lens or lens elements may be heated to remain above the dew point temperature so as to limit or substantially avoid moisture condensation from occurring within the lens.

Optionally, a lens body may be filled with a gas that is without water moisture. For example, a dry air, nitrogen gas or helium gas (or other suitable non-moisture gas or air) can be filled inside the lens body. The lens is then sealed to keep the moisture from getting inside lens from outside. The lens can be assembled in an enclosed environment that is filled with the gas without water moisture, such as a dry air, nitrogen or helium gas or the like. Optionally, another means for addressing the moisture issue may provide breathing paths within the lens. For example, the lens body can be designed to have one or more breathing paths by which air and water molecules can travel from all of the inside cavities of the lens to the outside of the lens, such as through the lens bottom or other body wall or housing wall. Optionally, by providing some moisture absorbing material inside the camera cavity, the water molecules that may originally exist inside the lens body can be absorbed by the moisture absorbing material.

The wide angle lens includes corrective refractive and diffractive elements positioned along the optic path between the wide angle outer optic and the image sensor. Additional corrective elements may also be included to further correct color or distortion within the refracted image. Diffractive elements are preferably included to correct the color focusing within the refracted image. The diffractive element or elements may further include an aspheric refractive optic element attached thereto or on an opposite surface of a respective optic element to further correct for distortions and aberrations within the focused image. Optionally, these refractive optic elements may be transparent plastic optic elements, having a varying width, such that the image passing through the refractive lens is refracted in varying degrees, corresponding to the magnitude of distortion in the image received by the refractive optics. Therefore, either by themselves, or in conjunction with the image sensor and/or image processing of the captured images, the refractive and/or diffractive optic elements of the lens function as a means for correcting distortions within the image.

The image system may further reduce image distortion via other distortion reducing means, such as by utilizing non-uniformly distributed pixels at the image array sensor (as discussed below), or such as via an on-imager processing unit (such as a system on chip or the like), such as an FPGA, CPLD, DSP, microprocessor or the like, and associated software, or such as via display means where the distortion correction is done in the displayed image via a non-uniformly distributed pixelated array of the display or via image processing hardware or software of the display device or module.

It is further envisioned that the wide angle imaging system may include electronic image processing or distortion correction to further correct the image displayed on the display. The distortion correction process may be performed by an image processing algorithm or by pixel distribution variation on image capture device and/or an associated display. Preferably, the system may display a vehicle reference, such as a rear bumper of the vehicle, as is seen outside the vehicle, so as to provide a sense of correctness to the image displayed to the driver. For example, an image processing algorithm may be provided which ensures that straight horizontal and/or vertical lines in the scenic information exteriorly of the vehicle are displayed as straight horizontal and/or vertical lines in the image displayed on the display. Such processing allows the imaging system to implement the wide angle lens and still provide a substantially realistic display image to the driver.

Optionally, the image sensor and/or image processing of the captured images may be capable of reducing distortion of the captured image. Such distortion reduction may be accomplished by a non-uniform array of photosensing pixels of the image sensor, such as described in U.S. Pat. No. 5,796,094, which is hereby incorporated herein by reference in its entirety. The non-uniform array may have a coarse distribution of pixels in a center region, with a finer distribution of pixels along the perimeter regions of the captured image. Such non-uniform pixelation of the imaging array receives the focused image and varies correspondingly with the magnitude of distortion in the image refracted through the lens.

Optionally, the image system of the present invention may provide correction of image perspective distortion. Image distortion from the camera with a wide angle lens includes not only lens geometrical distortion (such as pincushion and barrel distortions), but also perspective distortion, which is caused not by lens distortion, but rather is a perspective distortion whereby an object appears in different sizes when it is located at different distances from the camera. This type of distortion may also be corrected via one or more refractive and/or diffractive optic elements of the lens so as to function as lens-based means for correcting distortion. Optionally, the distortion may also or otherwise be corrected via an imager-based means, image processing means and/or display means for correcting distortion, such as those described above.

Optionally, the graphic overlays may be superimposed or projected onto the displayed image based on the image distortion. For example, the system may change or adjust the graphic overlay projection (such as the angle, curvature, thickness, length and/or other characteristics of the lines or overlays) of an overlay pattern in accordance with the position of the overlay pixel at the displayed image.

Thus, the wide angle rearward image system of the present invention provides a wide angle rearward field of view with reduced distortion to the driver of the vehicle so that the images displayed to the driver are readily recognized by the driver when the driver is reversing the vehicle. The image system preferably provides graphic overlays to further enhance the driver's cognitive awareness of detected objects rearward of the vehicle. Although described as a rearward facing imaging system, aspects of the present invention are equally suited for other imaging systems of vehicles, such as side object detection systems or blind spot detection systems or forward facing imaging systems, such as lane departure warning systems and/or the like.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method for guiding driving of a vehicle while reversing the vehicle toward a trailer hitch of a trailer, the method comprising:
    equipping a vehicle with an imaging system comprising (i) a rear backup camera disposed at a rear portion of the vehicle, the rear backup camera viewing rearward of the vehicle, and (ii) a display device comprising a video display screen disposed in the vehicle for viewing by a driver of the vehicle;
    displaying via the video display screen, and responsive to the vehicle being shifted into reverse gear, video images derived from image data captured by the rear backup camera;
    responsive to actuation of an input by the driver of the vehicle to aid back up of the vehicle toward the trailer hitch of the trailer, generating an alignment overlay and electronically superimposing the alignment overlay on the displayed video images to assist the driver of the vehicle when executing a reversing maneuver of the vehicle toward the trailer hitch of the trailer, wherein the alignment overlay extends longitudinally rearward from a central region of the vehicle displayed in the displayed video images, and wherein the input comprises an actuatable input other than the vehicle being shifted into reverse gear; and
    adjusting the generated and electronically superimposed alignment overlay on the displayed video images responsive to change in steering angle of the vehicle while the driver is executing the reversing maneuver of the vehicle toward the trailer hitch of the trailer.

2. The method of claim 1, comprising generating a backup overlay and electronically superimposing the backup overlay on the displayed video images to assist a driver of the vehicle when reversing the vehicle, and wherein the backup overlay comprises side overlays that are superimposed on the displayed video images so as to extend rearward from respective sides of the vehicle displayed in the displayed video images.

3. The method of claim 2, wherein the backup overlay is generated and electronically superimposed on the displayed video images responsive to the vehicle being shifted into reverse gear.

4. The method of claim 3, wherein the side overlays of the backup overlay are adjusted responsive to the change in steering angle of the vehicle while the driver is executing the reversing maneuver of the vehicle toward the trailer hitch of the trailer.

5. The method of claim 4, wherein the alignment overlay is superimposed along a centerline between the side overlays superimposed on the displayed video images when the steering angle of the vehicle is straight.

6. The method of claim 4, wherein the side overlays of the backup overlay comprise three dimensional side overlays.

7. The method of claim 4, wherein the alignment overlay is superimposed on the displayed video images so as to appear as having a different virtual height dimension than the side overlays to enhance the driver's cognitive awareness of the alignment overlay.

8. The method of claim 4, wherein each of the side overlays comprises first, second and third overlay zones, and wherein the first overlay zone of the side overlays is indicative of a first distance range from the vehicle to a first distance from the vehicle as displayed at the video display screen, and wherein the second overlay zone of the side overlays is indicative of a second distance range from the first distance to a second distance from the vehicle as displayed at the video display screen, and wherein the third overlay zone of the side overlays is indicative of a third distance range beyond the second distance from the vehicle as displayed at the video display screen, and wherein, as indicated to the driver viewing the displayed video images and the backup overlay at the video display screen, the first distance is closer to the vehicle than the second distance.

9. The method of claim 8, wherein the first overlay zone of the backup overlay comprises a first color and the second overlay zone comprises a second color and the third overlay zone comprises a third color, and wherein the first color is a different color than the second color and the second color is a different color than the third color.

10. The method of claim 8, further comprising (i) adjusting the first overlay zone in response to an object being detected rearward of the vehicle and within a first distance threshold from the vehicle and (ii) adjusting the second overlay zone in response to an object being detected rearward of the vehicle and within a second distance threshold from the vehicle, wherein the second distance threshold is a larger distance than the first distance threshold.

11. The method of claim 8, wherein, as seen by the driver viewing the displayed video images and the backup overlay at the video display screen, the side overlays of the backup overlay comprise spaced-apart lines extending rearward from the vehicle, and wherein the first overlay zone comprises a first segment of the spaced-apart lines, the second overlay zone comprises a second segment of the spaced-apart lines, and the third overlay zone comprises a third segment of the spaced-apart lines.

12. The method of claim 11, wherein the backup overlay comprises a first mark where the first overlay zone generally joins with the second overlay zone, and wherein the backup overlay comprises a second mark where the second overlay zone generally joins with the third overlay zone.

13. The method of claim 1, wherein the alignment overlay is superimposed on the displayed video images so as to extend upward toward the focal point of expansion of the displayed video images when the steering angle of the vehicle is straight.

14. The method of claim 1, wherein the alignment overlay comprises a three dimensional alignment overlay.

15. The method of claim 14, wherein the three dimensional alignment overlay is superimposed on the displayed video images so as to appear to be a virtual three dimensional element rearward of the vehicle.

16. The method of claim 1, wherein the rear backup camera is offset from the centerline of the vehicle, and wherein the alignment overlay is superimposed on the displayed video images as a sideward perspective view of a virtual three dimensional alignment overlay to enhance the driver's cognitive awareness of the alignment overlay.

17. The method of claim 1, wherein the alignment overlay is generated and electronically superimposed on the displayed video images responsive to detection, via image processing of image data captured by the rear backup camera, of the trailer rearward of the vehicle during the reversing maneuver of the vehicle of the vehicle toward the trailer hitch of the trailer.

18. The method of claim 1, wherein the input comprises an input selected from the group consisting of (i) a button in the vehicle, (ii) a control input and (iii) a voice recognition system.

19. A method for guiding driving of a vehicle while reversing the vehicle toward a trailer hitch of a trailer, the method comprising:
equipping a vehicle with an imaging system comprising (i) a rear backup camera disposed at a rear portion of the vehicle, the rear backup camera viewing rearward of the vehicle, and (ii) a display device comprising a video display screen disposed in the vehicle for viewing by a driver of the vehicle;
displaying via the video display screen, and responsive to the vehicle being shifted into reverse gear, video images derived from image data captured by the rear backup camera;
responsive to the vehicle being shifted into reverse gear, generating a backup overlay and electronically superimposing the backup overlay on the displayed video images to assist a driver of the vehicle when reversing the vehicle, and wherein the backup overlay comprises side overlays that are superimposed on the displayed video images so as to extend rearward from respective sides of the vehicle displayed in the displayed video images;
responsive to actuation of an input by the driver of the vehicle to aid back up of the vehicle toward the trailer hitch of the trailer, generating an alignment overlay and electronically superimposing the alignment overlay on the displayed video images to assist the driver of the vehicle when executing a reversing maneuver of the vehicle toward the trailer hitch of the trailer, wherein the alignment overlay extends longitudinally rearward from a central region of the vehicle displayed in the displayed video images and between the side overlays, and wherein the input comprises an actuatable input other than the vehicle being shifted into reverse gear, and wherein the input comprises an input selected from the group consisting of (i) a button in the vehicle, (ii) a control input and (iii) a voice recognition system; and
adjusting the generated and electronically superimposed backup overlay and alignment overlay on the displayed video images responsive to change in steering angle of the vehicle while the driver is executing the reversing maneuver of the vehicle toward the trailer hitch of the trailer.

20. The method of claim 19, wherein the alignment overlay is superimposed along a centerline between the side overlays superimposed on the displayed video images when the steering angle of the vehicle is straight.

21. The method of claim 19, wherein the side overlays of the backup overlay comprise three dimensional side overlays.

22. The method of claim 19, wherein the alignment overlay is superimposed on the displayed video images so as to appear as having a different virtual height dimension than the side overlays to enhance the driver's cognitive awareness of the alignment overlay.

23. The method of claim 19, wherein the alignment overlay is superimposed on the displayed video images so as to extend upward toward the focal point of expansion of the displayed video images when the steering angle of the vehicle is straight.

24. The method of claim 19, wherein the alignment overlay comprises a three dimensional alignment overlay.

25. The method of claim 24, wherein the three dimensional alignment overlay is superimposed on the displayed video images so as to appear to be a virtual three dimensional element rearward of the vehicle.

26. A method for guiding driving of a vehicle while reversing the vehicle toward a trailer hitch of a trailer, the method comprising:
equipping a vehicle with an imaging system comprising (i) a rear backup camera disposed at a rear portion of the vehicle, the rear backup camera viewing rearward of the vehicle, and (ii) a display device comprising a video display screen disposed in the vehicle for viewing by a driver of the vehicle;
displaying via the video display screen, and responsive to the vehicle being shifted into reverse gear, video images derived from image data captured by the rear backup camera;
responsive to the vehicle being shifted into reverse gear, generating a backup overlay and electronically superimposing the backup overlay on the displayed video images to assist the driver of the vehicle when reversing the vehicle;
responsive to actuation of an input by the driver of the vehicle to aid back up of the vehicle toward the trailer hitch of the trailer, generating an alignment overlay and electronically superimposing the alignment overlay on the displayed video images to assist the driver of the vehicle when executing a reversing maneuver of the vehicle toward the trailer hitch of the trailer, wherein the alignment overlay extends longitudinally rearward from a central region of the vehicle displayed in the displayed video images, and wherein the input comprises an actuatable input other than the vehicle being shifted into reverse gear, and wherein the input comprises an input selected from the group consisting of (i) a button in the vehicle, (ii) a control input and (iii) a voice recognition system;
wherein the alignment overlay is superimposed on the displayed video images so as to extend upward toward the focal point of expansion of the displayed video images when the steering angle of the vehicle is straight; and
adjusting the generated and electronically superimposed backup overlay and alignment overlay on the displayed video images responsive to change in steering angle of the vehicle while the driver is executing the reversing maneuver of the vehicle toward the trailer hitch of the trailer.

27. The method of claim 26, wherein the alignment overlay is superimposed on the displayed video images so as to appear as having a different virtual height dimension than the backup overlay to enhance the driver's cognitive awareness of the alignment overlay.

28. The method of claim 26, wherein the alignment overlay comprises a three dimensional alignment overlay.

29. The method of claim 28, wherein the three dimensional alignment overlay is superimposed on the displayed video images so as to appear to be a virtual three dimensional element rearward of the vehicle.

* * * * *